United States Patent
Sakamoto

(10) Patent No.: US 7,245,421 B2
(45) Date of Patent: Jul. 17, 2007

(54) WAVELENGTH-DIVISION MULTIPLEXING OPTICAL COMMUNICATION SYSTEM

(75) Inventor: Takeshi Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 10/695,398

(22) Filed: Oct. 29, 2003

(65) Prior Publication Data

US 2004/0091263 A1 May 13, 2004

(30) Foreign Application Priority Data

Oct. 30, 2002 (JP) .............................. 2002-315204

(51) Int. Cl.
*H04B 10/17* (2006.01)

(52) U.S. Cl. ........................................ 359/334; 398/37

(58) Field of Classification Search .............. 359/334; 398/37
See application file for complete search history.

(56) References Cited

U.S. PATENT DOCUMENTS

| | | | | |
|---|---|---|---|---|
| 5,923,453 | A * | 7/1999 | Yoneyama | 398/34 |
| 5,969,833 | A * | 10/1999 | Jensen | 398/34 |
| 6,134,032 | A * | 10/2000 | Kram et al. | 398/17 |
| 6,151,148 | A * | 11/2000 | Harano | 398/30 |
| 6,441,950 | B1 * | 8/2002 | Chen et al. | 359/334 |
| 6,462,861 | B2 * | 10/2002 | Ohshima et al. | 359/334 |
| 6,483,616 | B1 * | 11/2002 | Maddocks et al. | 398/1 |
| 6,785,042 | B1 * | 8/2004 | Onaka et al. | 359/334 |
| 6,819,875 | B2 * | 11/2004 | Touma | 398/177 |
| 6,839,162 | B2 | 1/2005 | Sekiya et al. | |
| 6,856,453 | B2 * | 2/2005 | Hainberger et al. | 359/334 |
| 2002/0041431 | A1 * | 4/2002 | Ohshima et al. | 359/334 |
| 2002/0054733 | A1 * | 5/2002 | Kagi et al. | 385/27 |
| 2002/0109906 | A1 * | 8/2002 | Grubb et al. | 359/334 |
| 2002/0181074 | A1 * | 12/2002 | Seydnejad et al. | 359/334 |
| 2004/0120033 | A1 * | 6/2004 | Beal et al. | 359/377 |
| 2004/0208503 | A1 * | 10/2004 | Shieh | 398/13 |
| 2005/0110980 | A1 * | 5/2005 | Maehara et al. | 356/73.1 |
| 2005/0196167 | A1 * | 9/2005 | Nagel | 398/37 |
| 2005/0196174 | A1 * | 9/2005 | Evangelides et al. | 398/151 |
| 2005/0226614 | A1 * | 10/2005 | Ogiwara et al. | 398/37 |

FOREIGN PATENT DOCUMENTS

| | | |
|---|---|---|
| JP | 2001-203414 | 7/2001 |
| JP | 2001-244528 | 9/2001 |
| JP | 2002-072262 | 3/2002 |

\* cited by examiner

*Primary Examiner*—Jack Keith
*Assistant Examiner*—Ari M. Diacou
(74) *Attorney, Agent, or Firm*—Staas & Halsey LLP

(57) ABSTRACT

In a WDM optical communication system in which an optical lossy medium, optical amplifiers and Raman amplifiers for compensating for loss in the optical lossy medium are cascade-connected, means are provided for acquiring the state of use of a Raman amplifier, at a node the same as that of the optical amplifier, in a link opposing a link in which the optical amplifier resides, or the state of use of a Raman amplifier at a node downstream of the optical amplifier. Whether the optical amplifier is to be made to perform a slope correction is decided based upon the state of use of the Raman amplifier.

16 Claims, 23 Drawing Sheets

WITHOUT SLOPE CORRECTION

WITH SLOPE CORRECTION

WITHOUT SLOPE CORRECTION

WITH SLOPE CORRECTION

WITHOUT SLOPE CORRECTION

WITH SLOPE CORRECTION

WAVELENGTH-DIVISION MULTIPLEXING OPTICAL COMMUNICATION SYSTEM

BACKGROUND OF THE INVENTION

This invention relates to a wavelength-division multiplexing optical transmission system. More particularly, the invention relates to a wavelength-division multiplexing optical communication system in which the capacity and transmission distance of an optical transmission system are increased by suppressing interchannel variations (inter-wavelength variations) in received light power, which are caused by wavelength-dependent gain of optical amplifiers and wavelength-dependent loss in the optical fiber of the transmission line.

Interchannel variations (inter-wavelength variations) in the power of received light in a WDM optical amplifying repeater transmission system are caused by the characteristics and wavelength dependence of an optical lossy medium (optical devices, optical amplifiers and the optical transmission line) through which the wavelength-division multiplexed signal is transmitted, and may be classified into the following components depending upon the cause and characteristics:

1) a slope (primary slope) component caused by the wavelength-dependent loss of the optical transmission line and optical devices and by the Raman effect of the optical transmission line;

2) a beat component (a comparatively gentle rise and fall in the shape of the spectrum) caused by the wavelength-dependent gain of the optical amplifiers; and 3) a ripple component (a deviation on the order of 0.1 to 1 nm) caused by a gain equalizer in the optical amplifiers, an optical device used in an OADM (Optical Add/Drop Multiplexer), etc., a deviation in the output level of the transmitter in each channel and an adjustment error following wavelength-division multiplexing.

Interchannel variation in optical power at. The receiving end that is the result of these factors produces variations in optical SNR and, as a result, degrades the transmission characteristic (bit error rate, or BER) and imposes a severe limitation upon the capacity and transmission distance of WDM optical transmission. More specifically, since the wavelength signal of lowest power among the multiplexed wavelength signals is the lower-limit value of receive power after transmission, the maximum transmission distance is limited by the wavelength signal of lowest power. Accordingly, reducing the variation between wavelengths after transmission is critical in terms of enlarging the maximum relay transmission distance.

To achieve this, measures and control set forth below have been adopted to minimize interchannel variations.

1) Slope, beat and ripple components are compensated for by optical pre-emphasis control.

2) The slope component is compensated for by slope compensation control by an optical amplifier (EDFA) constituted by a rare-earth doped fiber.

3) Slope and beat components are compensated for by slope compensation control and flattening control of Raman amplifiers.

Pre-Emphasis Control

Optical pre-emphasis control is a function for measuring or calculating the SNR of receive light at the receiving end and adjusting transmit power at the transmitting end so as to equalize the optical SNRs. FIG. 22 is a diagram useful in describing optical pre-emphasis control (see the specification of Japanese Patent Application Laid-Open No. 2001-203414). A WDM optical signal generated by an optical transmitter $11a$ in an optical transmitting station 11 is amplified by a plurality of optical repeaters $13a$, $13b$, . . . $13n$, which are provided in optical transmission lines 12, so as to compensate for loss along the optical transmission lines 12 and loss in the optical repeaters $13a$, $13b$, . . . $13n$, the amplified signal is transmitted to an optical receiving station 14 and the signal is received and processed by an optical receiver $14a$. Loss in the optical repeaters $13a$, $13b$, . . . $13n$ is produced by optical component parts such as a dispersion compensating fiber used in the stations.

When the WDM optical signal is sent from the optical transmitter $11a$ to the optical transmission lines 12, pre-emphasis is applied by a pre-emphasis control circuit $11b$ within the optical transmitting station. That is, the pre-emphasis control circuit $11b$ calculates the difference between an average value of optical SNRs of all channels received from the optical receiving station 14 and the optical SNR of each individual channel and adjusts the optical level of each channel so as to compensate for this difference. The optical transmitter $11a$ wavelength-division multiplexes the adjusted optical signals of all channels and sends the multiplexed signals to the optical transmission lines 12. The optical SNR of the optical signal of each wavelength is measured by an optical-SNR measurement circuit $14b$, e.g., a spectrum analyzer, provided in the optical receiving station 14, the information concerning the SNR is transmitted to the optical transmitting station 11 via a line 15 and then the above-described pre-emphasis control is repeated. As a result of the above operation, control is exercised in the optical receiving station 14 so as to uniformalize SNR.

Slope Compensation Control by Optical Amplifiers

Slope compensation control at an optical amplifier is a function for transmitting light provided with slope beforehand in such a manner that the wavelength characteristic of the input signal (spectrum) to the optical amplifier of the next stage will be flattened, this being performed based upon information concerning the multiplexing-number of wavelengths input to the optical amplifier and distance information relating to the transmission-line fiber length up to the destination of transmission (see the specification of Japanese Patent Application No. 2001-244528). FIG. 23 is a block diagram of an optical amplifier having a slope compensating function. When an optical amplifier 20 amplifies light entrant from an optical transmission line 21 and outputs the amplified light to an optical transmission line 22, the optical amplifier 20 performs amplification with a gain wavelength characteristic that compensates for the loss wavelength characteristic possessed by the optical transmission line 22. More specifically, in a case where light over a certain wavelength band exits from the optical amplifier 20, the optical amplifier 20 delivers the light so as to compensate beforehand for the difference between loss on the short-wavelength side and loss on the long-wavelength side of the light on the optical transmission line 22. The loss discrepancy is caused by the loss wavelength characteristic of the optical transmission line 22 during transmission of the light over this optical transmission line. The optical amplifier 20 applies compensation in advance upon making the gain wavelength characteristic a characteristic that is substantially the inverse of the loss wavelength characteristic of the optical transmission line 22.

The optical amplifier 20 includes first optical amplifying means $20a$ for amplifying light; optical attenuating means $20b$ for attenuating the light amplified by the first optical amplifying mans $20a$; second optical amplifying means $20c$ for amplifying the light attenuated by the optical attenuating means 20b and outputting the amplified light to the optical transmission line 22; and control means 20d for adjusting the amount of attenuation in the optical attenuating means 20b in such a manner that the gain wavelength characteristic of the optical amplifier 20 will substantially compensate for the loss wavelength characteristic of the optical transmission line 22. In actuality, the optical amplifier of FIG. 23 is provided for every several wavelengths and the output light signals of each of these optical amplifiers are combined to compensate for the loss wavelength characteristic of the optical transmission line 22.

Slope Compensation Control and Flattening Control by Raman Amplifiers

A Raman amplifier produces gain in a signal wavelength that has been shifted from the wavelength of the excitation light by the amount of the Raman shift in the amplifying medium, as shown in FIG. 24. The amount of Raman shift and the Raman band are specific to the amplifying medium. Accordingly, if the excitation wavelength is shifted to the long-wavelength side, then the center wavelength of the gain and the gain band will be shifted toward the long-wavelength side by an amount identical with the amount of shift of the excitation wavelength. Further, optical amplification over a wide band is possible, as shown in FIG. 25, by inputting excitation light sources, which have slightly different excitation wavelengths from one another, to the amplifying medium collectively. Further, since gain varies in such a manner that the higher the power of wavelength of the excitation light, the greater the gain, any gain characteristic can be assigned to a Raman amplifier by controlling the power of each excitation wavelength (see the specification of Japanese Patent Application Laid-Open No. 2002-72262).

Tilt compensation control by a Raman amplifier is of two types. First tilt compensation control is slope compensation control. This is a function (feed-forward control) for calculating the amount of slope (amount of tilt) of the wavelength characteristic from the wavelength multiplexing number of the input optical signal and the distance along the optical transmission line in the interval that is to undergo compensation, finding the excitation ratio from the amount of slope and amplifying the input spectrum of the optical amplifier, which is connected to the Raman amplifier, while flattening the spectrum. FIG. 26 is a block diagram illustrating slope compensation control by a Raman amplifier. Here a plurality of optical signals are wavelength-division multiplexed and input to a back-excited Raman amplifying medium 31 from the input side of a Raman amplifier 30. A wavelength-division multiplexer 32 multiplexes excitation light of wavelengths $\lambda p1$ to $\lambda p3$ from excitation light-source blocks 33a, 33b, 33c, respectively, having different center wavelengths, and inputs the multiplexed signal to a combining coupler 34. The latter combines the excitation light of wavelengths $\lambda p1$ to $\lambda p3$ and the wavelength-multiplexed signal obtained by wavelength multiplexing light of a plurality of main signals, and supplies the combined signal to the Raman amplifying medium 31. An excitation light controller 35 calculates the amount of slope (the amount of tilt of each wavelength) of the wavelength characteristic from the multiplexing number of the wavelength-division multiplexed signal, which have been obtained by wavelength-division multiplexing the light of the main signals, and the distance along the optical transmission line of the interval to undergo compensation, calculates the power of each excitation light signal so as to obtain a characteristic that will be the inverse of the wavelength characteristic and inputs the power to the excitation light-source blocks 33a, 33b, 33c. As a result, the excitation light-source blocks 33a, 33b, 33c generate excitation light of the wavelengths $\lambda p1$ to $\lambda p3$ having an intensity conforming to the input power, and correct the tilt that is generated in the optical transmission line in the interval that undergoes compensation.

FIG. 27 is a block diagram illustrating flattening control of a Raman amplifier. Components identical with those shown in FIG. 26 are designated by like reference characters. This arrangement (feedback control) differs in that with flattening control, the slope (tilt) of the wavelength characteristic at the input of the optical amplifier (not shown) (the output of the Raman amplifier) is detected by a spectrum analyzer 37 and the tilt is corrected to achieve flattening. In FIG. 27, the excitation light controller 35 calculates the slope (tilt) of the wavelength characteristic from the output of the spectrum analyzer 37, calculates the power of each excitation light signal so as to obtain a characteristic that will be the inverse of the wavelength characteristic and inputs the power to the excitation light-source blocks 33a, 33b, 33c. As a result, the excitation light-source blocks 33a, 33b, 33c generate excitation light of the wavelengths $\lambda p1$ to $\lambda p3$ having an intensity conforming to the input power, correct the tilt that is generated in the optical transmission line in the interval that is to undergo compensation and flatten the wavelength characteristic.

In FIG. 27, the slope (tilt) of the wavelength characteristic of the wavelength-division multiplexed signal output from the Raman amplifier is detected and the tilt is flattened. In actuality, however, an optical amplifier is connected to the Raman amplifier and therefore the input spectrum to the optical amplifier is flattened while the spectrum (wavelength characteristic) at the input or output of the optical amplifier is monitored using a spectrum analyzer module.

Interchannel optical power variations and optical SNR deviations at the receiving end are minimized and high-capacity, long-haul transmission is made possible by the compensating scheme described above.

In order to satisfy the need in the marketplace for a reduction in cost per unit wavelength, there is growing demand for an ultra-long-haul transmission system wherein the spans in which a costly regenerator is inserted are made as long as possible and signals are transmitted in the form of light over very long distances of 2000 km and 3000 km. However, the longer the distance over which light is transmitted as is, the greater the number of transmission lines traversed, the greater the number of optical devices and the greater the number of optical amplifiers. As a consequence, channel-to-channel variations in received optical power increase.

Owing to a limitation upon amount of attenuation by the optical attenuator and a limitation upon the input level of the amplifier of the transmitted light at the transmitting end, there is a limit to the amount of tilt that can be handled by pre-emphasis control. In a case where compensation is inadequate, the optical SNR of a specific channel is degraded. To realize ultra-long-haul transmission, it is necessary to accomplish elimination of slope and beat components by the optical amplifier and Raman amplifier as much as possible at a stage prior to application of pre-emphasis in order to equalize the optical SNRs of all channels by optical pre-emphasis control under conditions where the amount of attenuation of the optical attenuator at the transmitting end is limited.

However, increasing the amount of tilt compensation by an optical amplifier or Raman amplifier, etc., and improving the optical characteristic in order to achieve ultra-long-haul transmission are mutually contradictory. For example, if amount of slope compensation is increased in the case of an optical amplifier, allowance must be made for superfluous excitation power. As a result, the noise figure (NF) is degraded and this can lead to a decline in overall optical SNR at the receiving end. Further, if flattening of the input to the optical amplifier of the next stage is given priority in the case of a Raman amplifier, there is a possibility that the input level to the optical amplifier will decline. This also leads to worsening of the optical SNR.

In order to realize even a slight improvement in the optical SNR characteristic in an ultra-long-haul transmission system, the general practice is to give priority to the noise figure or to the gain of the Raman amplifier (the input level to the optical amplifier). Accordingly, to compensate for tilt, a method of performing tilt compensation at nodes along the way has been adopted, as by using a compensating device such as an active GEQ (active gain equalizer). However, the cost is high and there is the danger that the optical SNR characteristic will be degraded by introducing such compensating devices. For these reasons, it is necessary to devise some way of minimizing the insertion of tilt compensators, or in other words, to extend, as much as possible, the distance up to the point at which a tilt compensator is inserted.

In order to lighten the load on optical pre-emphasis control, give priority to improvement of the optical SNR and carry out tilt compensation by optical amplifiers and Raman amplifiers effectively, tilt compensation by the optical amplifiers and Raman amplifiers should not be performed independently. Control and management that will apply the required amount of tilt compensation to the required location in terms of the total system are necessary.

SUMMARY OF THE INVENTION

Accordingly, an object of the present invention is to so arrange it that the load upon optical pre-emphasis control is alleviated, improvement in optical SNR is prioritized and tilt compensation by optical amplifiers and Raman amplifiers can be performed effectively.

Another object of the present invention is to so arrange it that the required amount of tilt compensation is applied to the required location in terms of the total system, rather than perform tilt compensation by optical amplifiers and Raman amplifiers independently.

A further object of the present invention is to so arrange it that tilt compensation can be performed effectively overall by using a monitoring control signal or external control device, etc.

According to the present invention, the foregoing objects are attained by providing wavelength-division multiplexing optical communication systems in which an optical lossy medium, optical amplifiers and Raman amplifiers for compensating for loss in the optical lossy medium are cascade-connected.

A first wavelength-division multiplexing optical communication system according to the present invention comprises: means, which is provided in an optical amplifier, for correcting slope of a wavelength characteristic produced by wavelength-dependent loss of the optical lossy medium; means for acquiring state of use of a Raman amplifier, at a node the same as that of the optical amplifier, in a link opposing a link in which the optical amplifier exists, or state of use of a Raman amplifier at a node downstream of the optical amplifier; and means for deciding, based upon the state of use of the Raman amplifier, whether or not to cause the optical amplifier to perform a slope correction.

In accordance with the first wavelength-division multiplexing optical communication system, in a case where it will suffice to apply a slope correction only by one of an optical amplifier and Raman amplifier between nodes, the optical amplifier can be made to apply tilt compensation depending upon existence of a Raman amplifier in the opposing link. Further, in a case where uplink and downlink span distances and fiber types differ, the optical amplifier can be made to apply tilt compensation depending upon state of use of a Raman amplifier at a node on the downstream side of the optical amplifier. As a result, over-compensation does not occur and the number of optical amplifiers that perform slope correction can be reduced. Further, the state of use of a Raman amplifier at a node on the downstream side can be discriminated using a monitoring control signal or external control device.

A second wavelength-division multiplexing optical communication system according to the present invention comprises: means, which is provided in an optical amplifier, for correcting slope of a wavelength characteristic produced by wavelength-dependent loss of the optical lossy medium; means for acquiring state of flattening-control implementation which indicates whether a Raman amplifier is implementing control to flatten a wavelength characteristic at a node downstream of the optical amplifier, based upon the wavelength characteristic on an input side or output side of said optical amplifier connected to said Raman amplifier; and means for deciding whether or not to cause the optical amplifier to perform a slope correction based upon the state of flattening-control implementation by the Raman amplifier.

In accordance with the second wavelength-division multiplexing optical communication system, the optical amplifier can be made to apply tilt compensation depending upon the state of flattening-control implementation by the Raman amplifier at a node downstream of the optical amplifier also in a case where the Raman amplifier performs flattening control. As a result, over-compensation does not occur and the number of optical amplifiers that perform slope correction can be reduced. Further, the state of flattening-control implementation by a Raman amplifier at a node on the downstream side can be discriminated using a monitoring control signal or external control device.

A third wavelength-division multiplexing optical communication system according to the present invention comprises: slope-correction control means, which is provided in a Raman amplifier, for correcting slope of a wavelength characteristic produced by wavelength-dependent loss of the optical lossy medium; means for calculating amount of slope correction based upon amount of tilt of a wavelength characteristic of a transmission line produced between the Raman amplifier and a node at which the next Raman amplifier exists; and means for setting the amount of slope correction in the slope-correction control means of the Raman amplifier, with slope correction being performed solely by the Raman amplifier.

In accordance with the third wavelength-division multiplexing optical communication system, a slope correction can be performed solely by the Raman amplifier and it is unnecessary to perform a slope correction by the optical amplifier. This makes it possible to prevent a decline in the optical SNR.

A fourth wavelength-division multiplexing optical communication system according to the present invention comprises: slope-correction control means, which is provided in a Raman amplifier, for correcting slope of a wavelength characteristic produced by wavelength-dependent loss of the optical lossy medium; and means for calculating amount of slope correction by the Raman amplifier by subtracting, from an overall amount of tilt of a wavelength characteristic produced between the Raman amplifier and a node at which the next Raman amplifier exists, an amount of slope correction by optical amplifiers that exist between these Raman amplifiers, and setting the calculated amount of slope correction in the slope-correction control means; the Raman amplifier performing a slope correction based upon the set amount of slope correction.

The fourth embodiment is such that even if the amount of slope correction by the optical amplifier is limited, the shortfall is made up for by the Raman amplifier, thereby enabling slope compensation to be applied.

A fifth wavelength-division multiplexing optical communication system according to the present invention comprises: slope-correction control means, which is provided in each of an optical amplifier and Raman amplifier wherein amount of slope correction is limited, for correcting slope of a wavelength characteristic produced by wavelength-dependent loss of the optical lossy medium; and means for acquiring information concerning wavelength-dependent loss of the optical loss medium between nodes and amount of slope correction by each optical amplifier and Raman amplifier, calculating from this information and amounts of slope correction an amount of tilt of a wavelength characteristic at an input section of each optical amplifier, deciding amounts of slope correction by optical loss compensators in order from an upstream side using the amount of tilt, and repeating the above control with respect to a downstream node when the amount of slope correction has exceeded the capability of an optical loss compensator, thereby deciding and setting amount of slope correction by each optical loss compensator; each optical loss compensator (optical amplifier and Raman amplifier) performing a slope correction using the set amount of slope correction.

The fifth wavelength-division multiplexing optical communication system is such that even if the amount of slope correction by the optical amplifier and Raman amplifier is limited, an optimum amount of correction can be set in the optical amplifier and Raman amplifier within the bounds of the limited amount of correction.

Other features and advantages of the present invention will be apparent from the following description taken in conjunction with the accompanying drawings.

DESCRIPTION OF THE PREFERRED EMBODIMENTS

Overview of the Present Invention

In an optical communication system, it is necessary to consider whether optical amplifiers and Raman amplifiers at each of the nodes of the system should perform a slope correction and flattening control, the degree to which these operations should be performed if they are necessary, how the related information is to be acquired, the locations at which control should be performed and the amount of control to be decided.

A monitoring control signal is used to obtain the necessary information. The monitoring control signal is sent and received upon inserting into the signal the positions of the Raman amplifiers, whether or not flattening control is to be performed, the amount of correction of which each optical amplifier and Raman amplifier is capable and, if necessary, amount of tilt of the wavelength characteristics at each node. Based on the monitoring control signal sent and received, a monitoring control device, or the optical amplifier or Raman amplifier per se, at each node calculates the amount of control and then actually exercises control.

Further, if complex, detailed calculations are required to decide the optimum amount of control, it is also possible to first perform the calculations by an external tool (an external control unit) or the like, then set the proper values in the monitoring control device, or in the optical amplifier and Raman amplifier, at each node by way of the monitoring control signal.

Furthermore, if the excitation-light wavelength of a Raman amplifier is variable, it is also possible to perform finer flattening control based upon data collected from each node.

In the embodiments set forth below, there is proposed a wavelength-division multiplexing optical communication system that is capable of dealing with tilt upon taking into consideration limitations such as the amount of slope correction of which optical amplifiers and Raman amplifier are capable and the amount of control achievable by pre-emphasis.

Summary of Prior-Art Slope Correction Scheme

In order to facilitate an understanding of a first embodiment of the present invention, a conventional slope correction scheme using an optical amplifier and one using a Raman amplifier will be summarized first in simple terms.

Figure 1A:
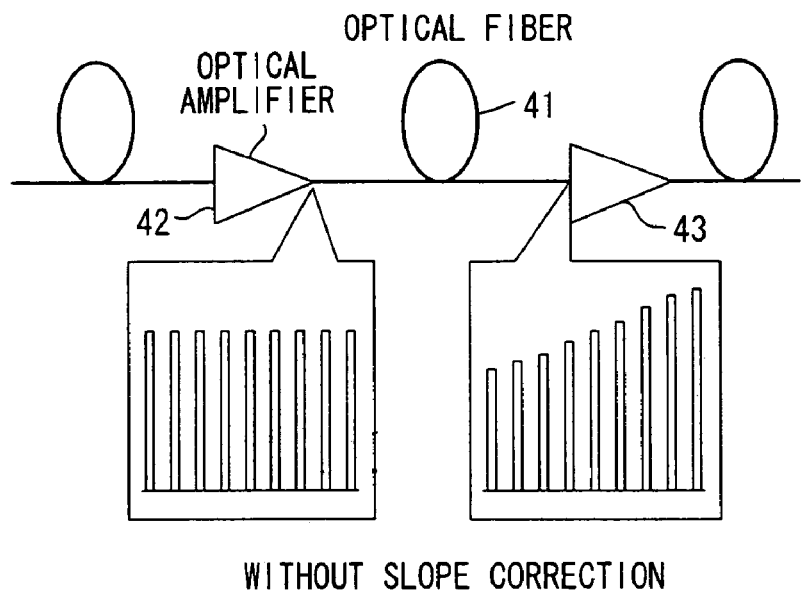
FIGS. 1A and 1B are diagrams useful in describing slope correction by an optical amplifier.
Figure 1B:
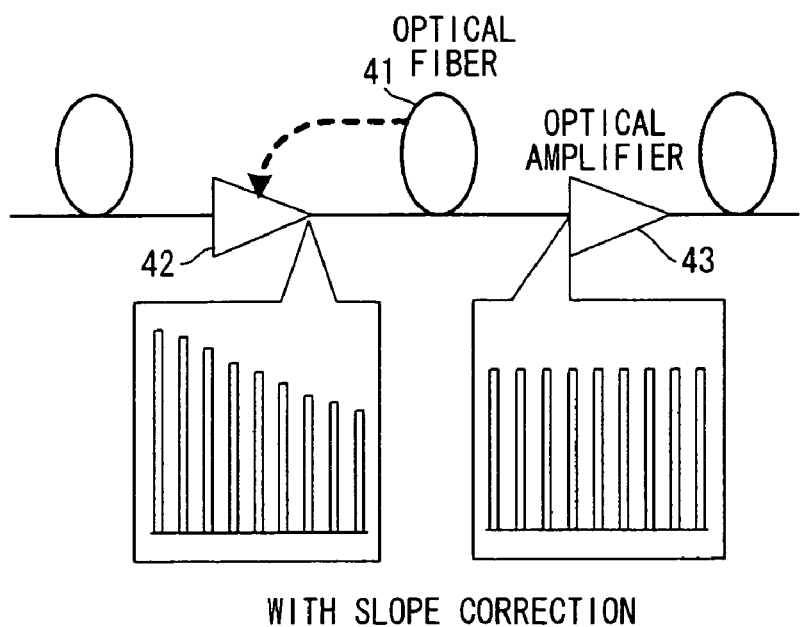

FIGS. 1A and 1B are diagrams useful in describing slope correction by an optical amplifier. Though the slope correcting components of the optical amplifier are not shown, it should be understood these are the same as the components shown in FIG. 23.

A transmission line (optical fiber) 41 in FIGS. 1A and 1B has a wavelength loss characteristic in which loss on the short-wavelength side is greater than that on the long-wavelength side. If a flat spectrum is output as is at the transmitting end of an optical amplifier 42, as shown in FIG. 1A, then it will enter the input section of an optical amplifier 43, which is the next stage, in a state exhibiting tilt. An ideal spectrum in an optical transmission system is one that is flat at the input section of each optical amplifier. If the condition is as shown in FIG. 1A, therefore, the optical SNR on the short-wavelength side will suffer marded degradation. For this reason, the design is such that the optical output level on the short-wavelength side is raised beforehand at the transmitting end of the optical amplifier 42, as shown in FIG. 1B, before the signal is transmitted. As a result, the input spectrum applied to the optical amplifier 43 in the next stage is flattened. This is the slope correction applied by the optical amplifier.

Figure 2A:
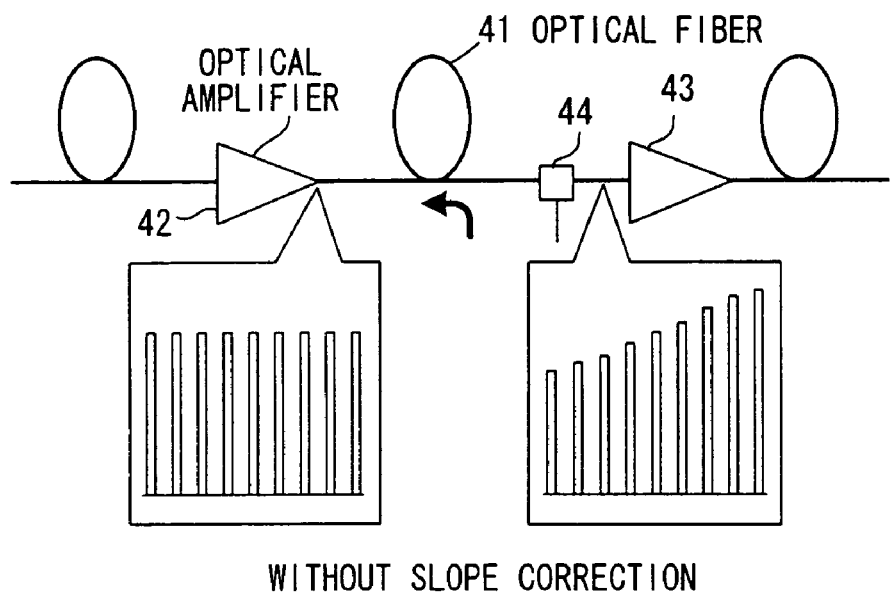
FIGS. 2A and 2B are diagrams useful in describing slope correction by a Raman amplifier.
Figure 2B:
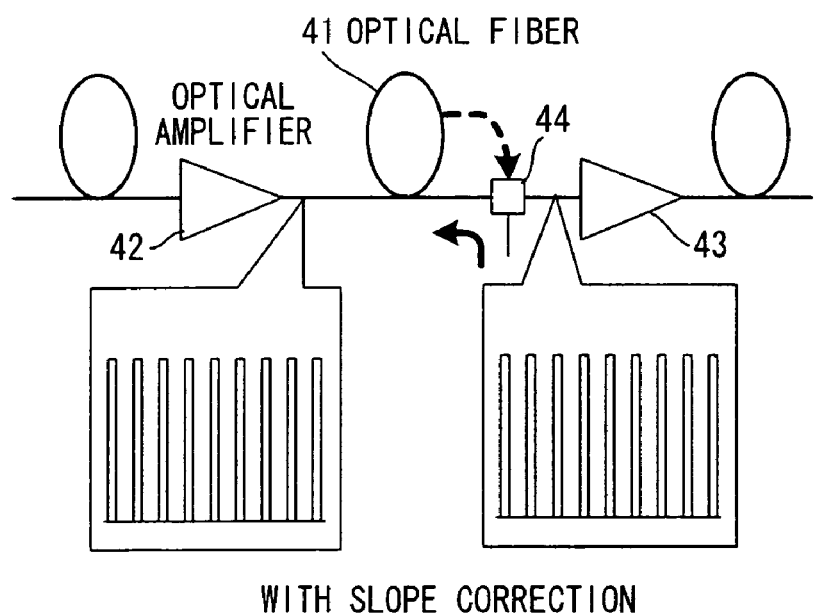

FIGS. 2A and 2B are diagrams useful in describing slope correction by a Raman amplifier. Though the slope correcting component parts of the Raman amplifier are not shown, it should be understood these are the same as the components shown in FIG. 26.

In the case of an amplification scheme in which the same gain is applied from the short-wavelength side to the long-wavelength side, the input spectrum to the optical amplifier 43 will exhibit tilt (see FIG. 2A), owing to wavelength-dependent loss along the optical transmission line 41, unless the optical amplifiers 42, 43 and a Raman amplifier 44 all apply a slope correction. The wavelength-dependent loss is factored in as by calculating or measuring it, and excitation is applied to the Raman amplifier 44 so as to raise the short-wavelength side and lower the long-wavelength side. This makes it possible to maintain a flat spectrum at the receiving end, as illustrated in FIG. 2B. (This operation is slope control.)

Figure 3A:
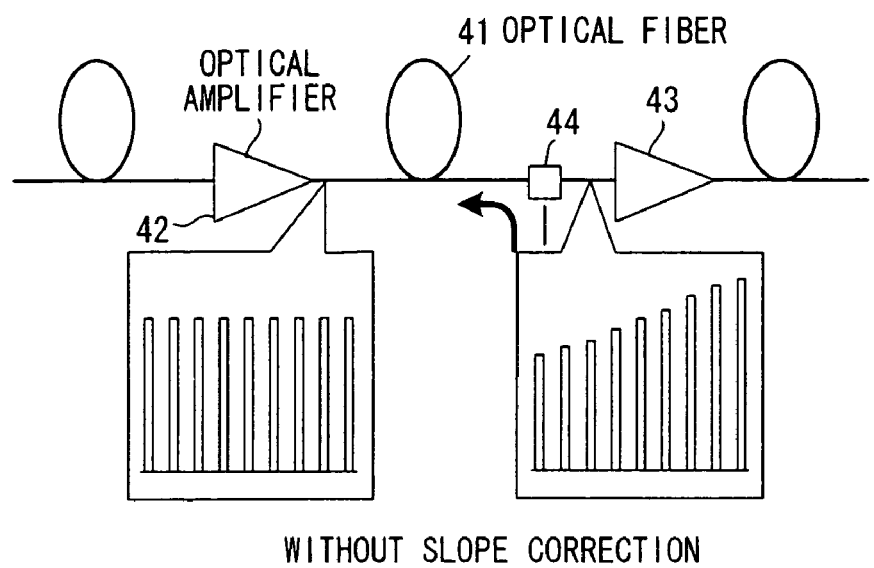
FIGS. 3A and 3B are diagrams useful in describing flattening control by a Raman amplifier.
Figure 3B:
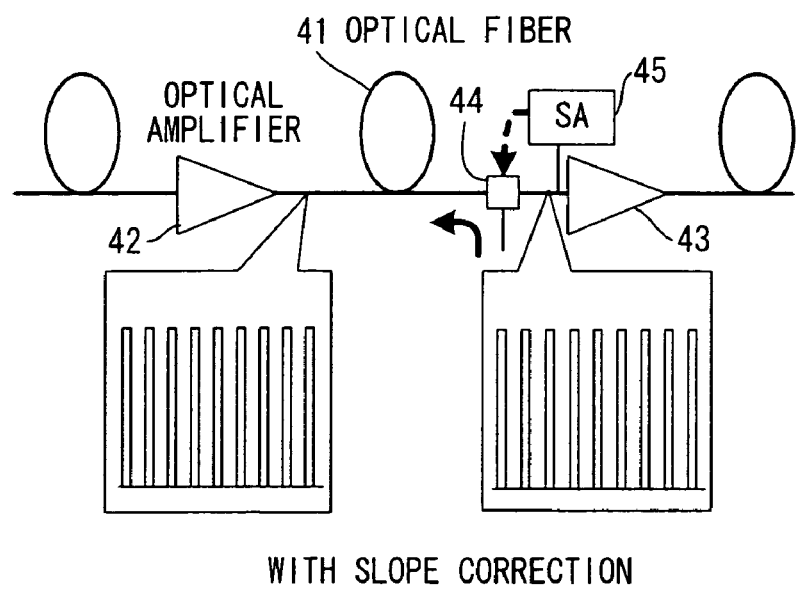

FIGS. 3A and 3B take the approach of FIGS. 2A and 2B a step further. As shown in FIG. 3B, the input section to the optical amplifier 43 of the next stage is provided with a spectrum analyzer 45 for detecting the wavelength characteristic. While verifying that the wavelength characteristic is flat at this input section, the spectrum analyzer 45 adjusts the excitation light of the Raman amplifier 44. (This operation is flattening control.) The component parts used in flattening control by the Raman amplifier are not illustrated but are the same as those shown in FIG. 27.

In comparison with slope control shown in FIGS. 2A and 2B, flattening control is advantageous in that calculation error does not occur and dynamic shifts in the spectrum can be accommodated. Further, the spectrum analyzer 45 is capable of compensating for slope or beat components produced ahead of the optical amplifier 42. In addition, when the beat and slope components of the optical amplifier 43 are small, it is also possible to place the spectrum analyzer 45 at the output of the optical amplifier 43 by ignoring these components. It should be noted that FIG. 3A is for a case where flattening control is not applied.

Slope correction in each of the slope correction schemes cited above will be described in order when taken into account in an overall system starting with a situation in which there is absolutely no limitation upon amount of correction and then transitioning to situations in which gradually greater limitations are applied.

Figure 4:
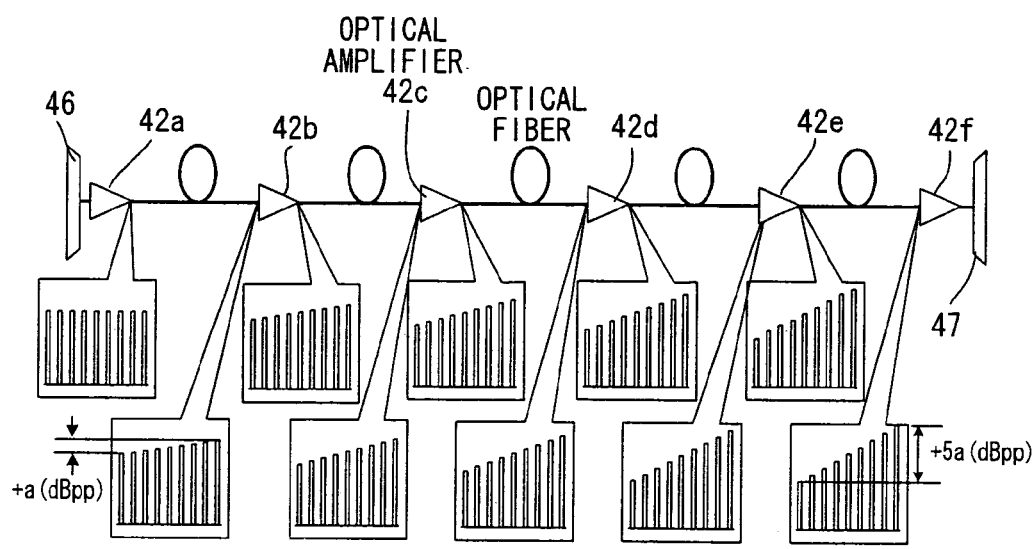
FIG. 4 is a diagram useful in describing accumulation of tilt in a system in which a slope correction is not applied.

(A) Situation in Which Amount of Slope Correction by Optical Amplifiers and Raman Amplifiers is Sufficient FIG. 4 illustrates a case where optical amplifiers 42a to 42f between a transmitting end 46 and a receiving end 47 apply no slope correction whatsoever in a wavelength-division multiplexing optical communication system that does not employ Raman amplifiers. Assume that tilt of +a (dBpp) is produced per span owing to such effects as wavelength-dependent loss along each transmission line. The sign of tilt where the short-wavelength side is low and the long-wavelength side is high is plus, while the sign in the converse case is minus. In FIG. 4, the tilt of each span accumulates to produce a tilt of +5a (dBpp) at the receiving end. Consequently, optical SNR on the short-wavelength side undergoes a marked decline.

Figure 5:
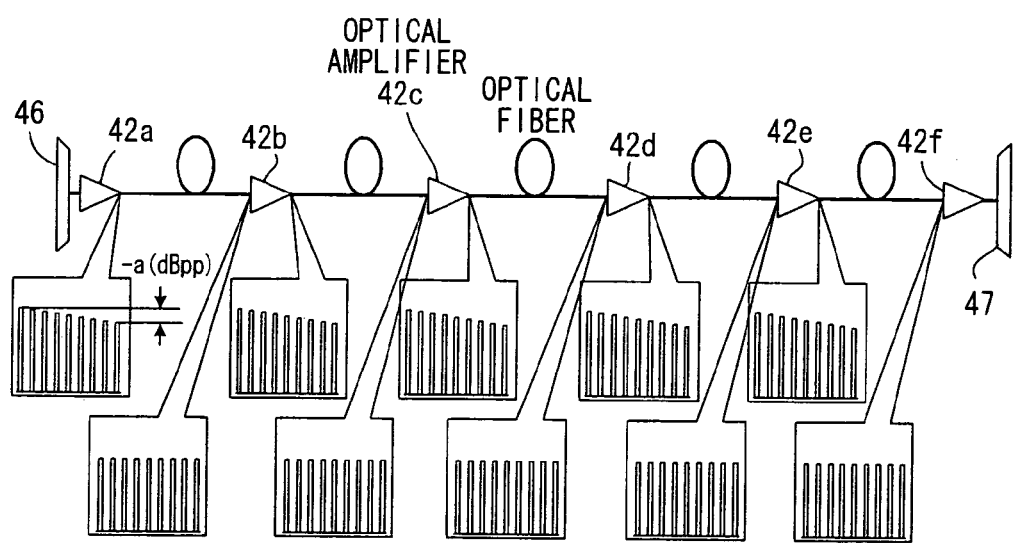
FIG. 5 is a diagram useful in describing spectrums in a system in which a slope correction is applied.

FIG. 5 illustrates a case where the optical amplifiers 42a to 42f between the transmitting end 46 and receiving end 47 each apply a slope correction of –a (dB) in a wavelength-division multiplexing optical communication system that likewise is devoid of Raman amplifiers. In this case, the spectrum at the input section of each of the optical amplifiers 42a to 42f is flat and the optical SNR is ideal.

Figure 6:
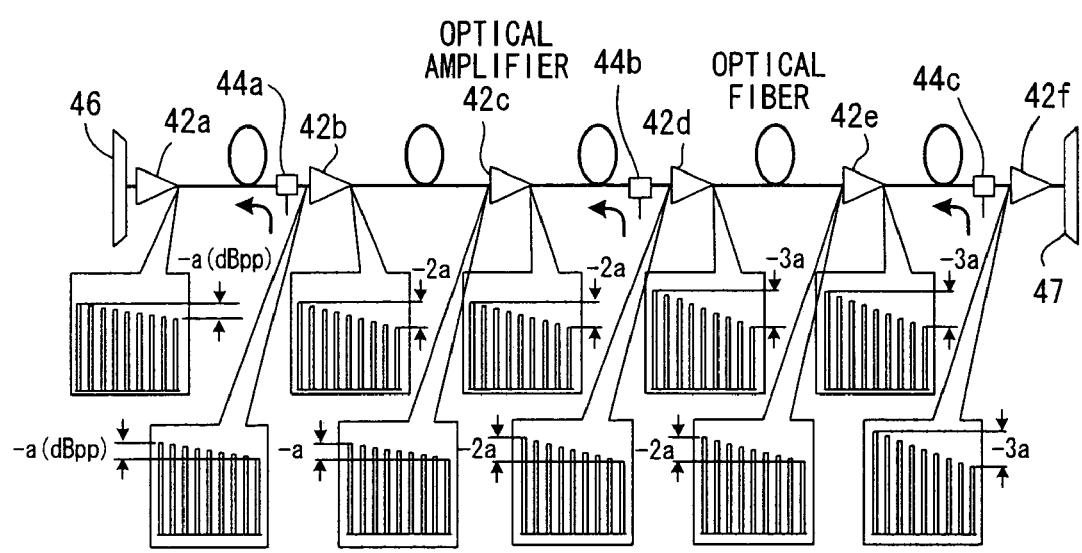
FIG. 6 is a diagram useful in describing spectrums in a case where a slope correction is performed by both optical amplifiers and Raman amplifiers.

FIG. 6 illustrates a wavelength-division multiplexing optical communication system in which Raman amplifiers 44a to 44c for performing a slope correction have been inserted into the wavelength-division multiplexing optical communication system of FIG. 5. In this wavelength-division multiplexing optical communication system, each of the optical amplifiers 42a to 42f and each of the Raman amplifiers 44a to 44c applies a slope correction of –a (dB) independently. In this case, the overall system is over-compensated and the optical SNR on the long-wavelength side is degraded markedly at the receiving end.

In a case where the amount of slope correction by each of the optical amplifiers and Raman amplifiers is sufficient in the wavelength-division multiplexing optical communication system of FIG. 6, it will suffice if either the optical amplifier or Raman amplifier applies a slope correction with respect to a certain single span. In such case, the first embodiment decides, by referring to the state of insertion of Raman amplifiers in the overall system, whether each optical amplifier is to apply a slope correction or not.

(a) First Embodiment

Figure 7:
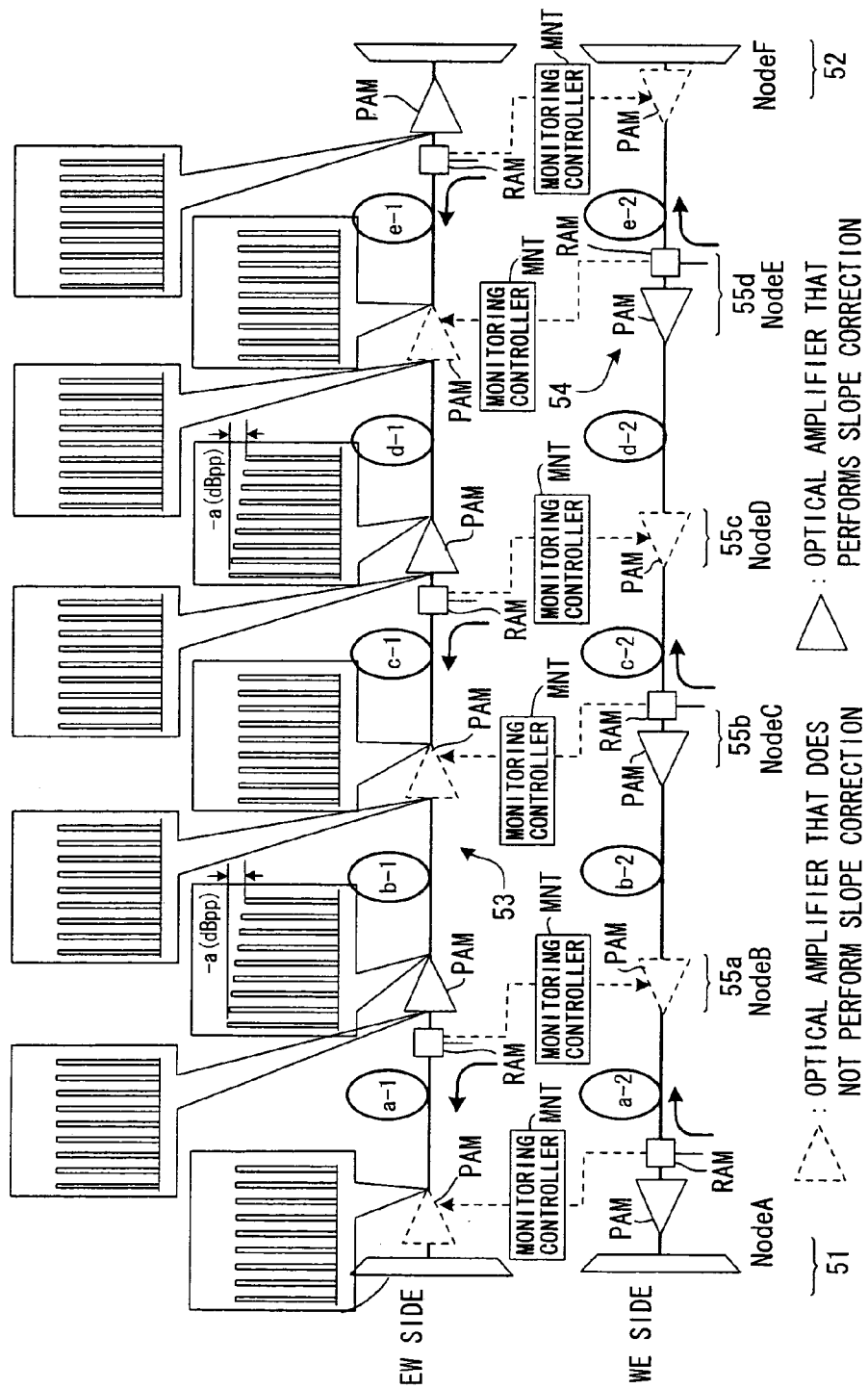
FIG. 7 is a diagram illustrating the configuration of a wavelength-division multiplexing optical communication system according to a first embodiment for deciding whether to perform a slope correction upon observing the state of insertion of a Raman amplifier in a link on an opposing side.
Figure 23:
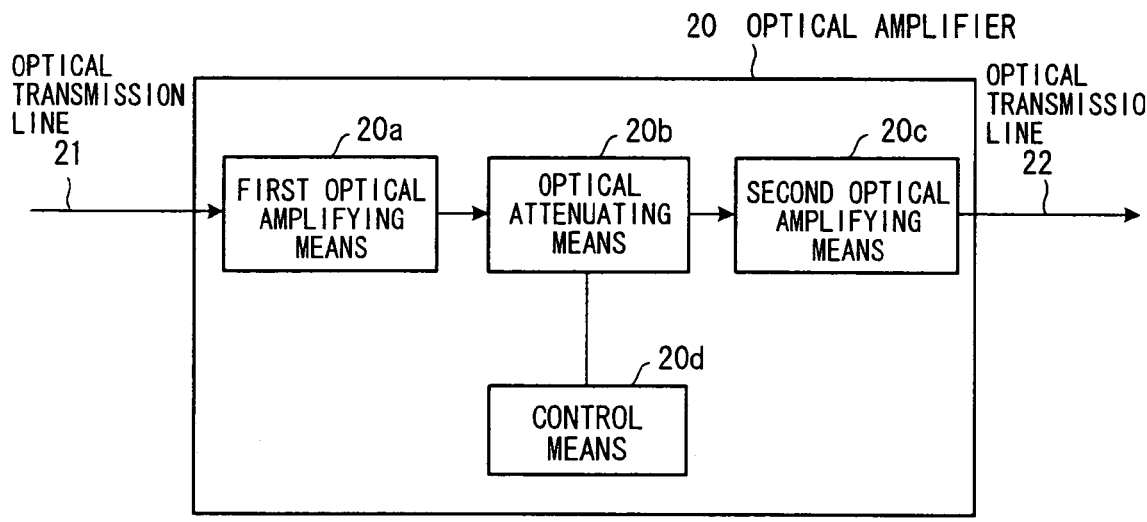
FIG. 23 is a block diagram of an optical amplifier having a slope compensating function according to the prior art.
Figure 24:
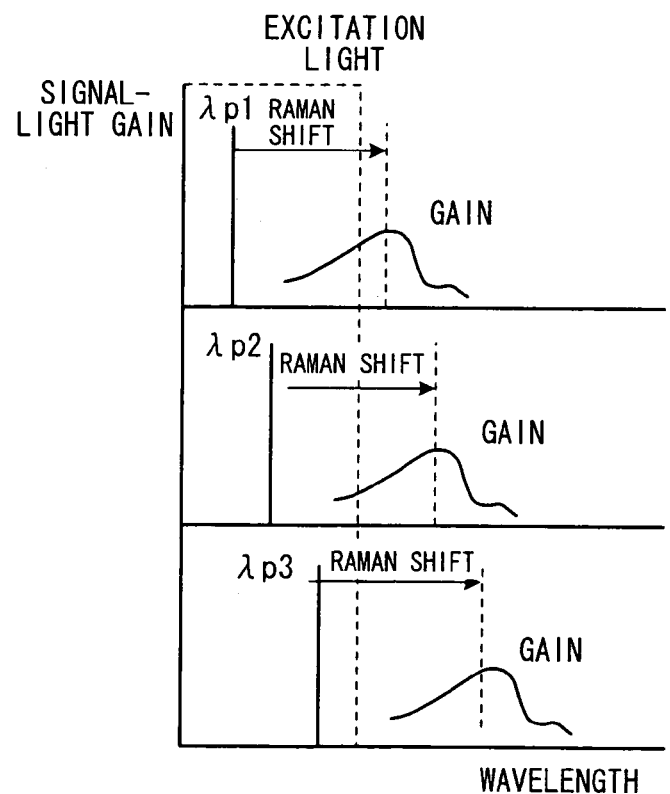
FIG. 24 is a diagram (part 1) showing the relationship between excitation wavelength and gain according to the prior art.
Figure 25:
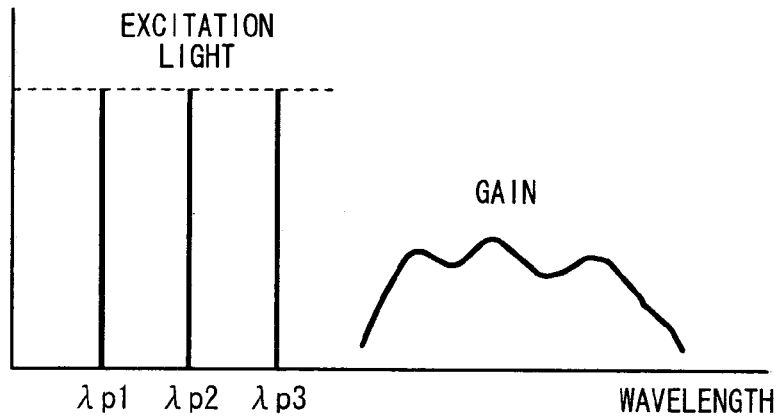
FIG. 25 is a diagram (part 2) showing the relationship between excitation wavelength and gain according to the prior art.
Figure 26:
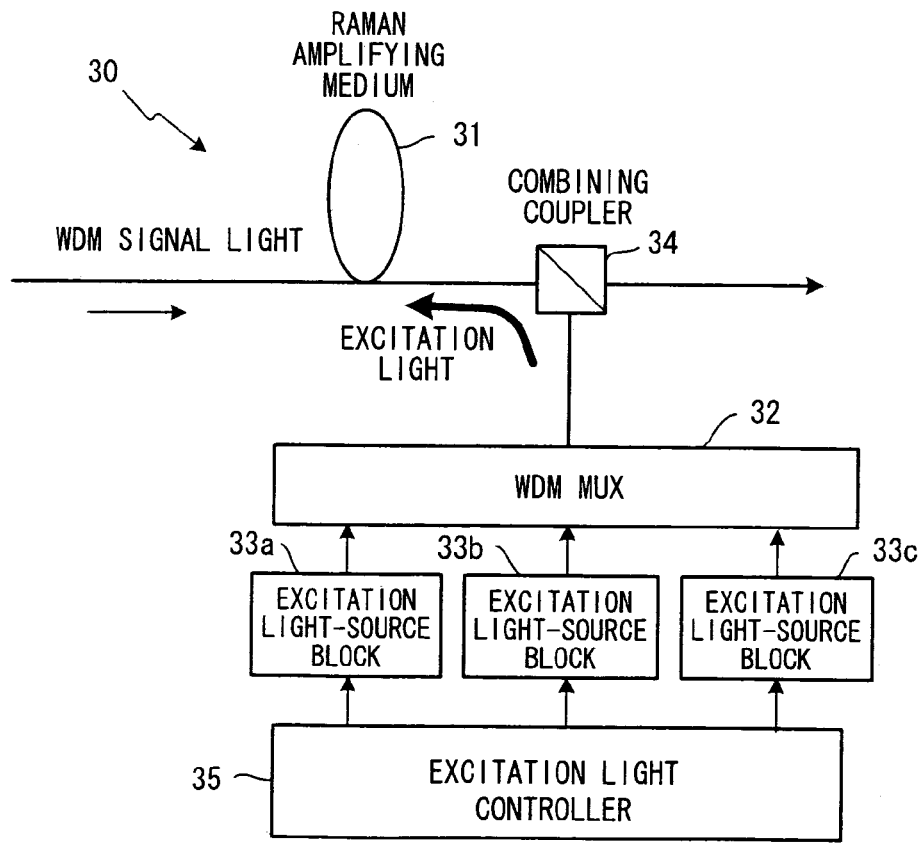
FIG. 26 is a block diagram illustrating slope compensation control of a Raman amplifier according to the prior art.

FIG. 7 is a diagram illustrating the configuration of a wavelength-division multiplexing optical communication system according to a first embodiment for deciding whether to perform a slope correction upon observing the state of insertion of a Raman amplifier in a link on an opposing side. It is assumed that each optical amplifier and each Raman amplifier has a slope compensating function and the structures thereof are as illustrated in FIGS. 23 and 26, respectively. Transmitting and receiving ends 51, 52, respectively, are connected by an EW-side link (uplink) 53 and a WE-side link (downlink) 54, and repeater stations 55a to 55d for amplifying optical signals and compensating for interchannel variation are provided at predetermined distances. If the transmitting end, receiving end and repeater stations are called nodes, then the system will have nodes A to F as illustrated. Node A, which is the transmitting end 51, nodes B to E, which are the repeater stations 55a to 55d, and node F, which is the receiving end 52, are each provided with uplink and downlink optical amplifiers PAM and with a monitoring controller MNT. Raman amplifiers RMA are provided where appropriate.

In a case where all of the Raman amplifiers RAM perform a slope correction, the following is taken into consideration to decide whether an optical amplifier is to perform a slope correction:

Usually, the transmission line from node A to node B has the same distance and uses the same type fiber on both the EW and WE sides. In many cases, therefore, the pattern in which the Raman amplifiers RAM are inserted also is the same. Accordingly, the monitoring controller MNT at each node checks to determine whether a Raman amplifier RAM exists in the link on the side opposing the link in which the optical amplifier PAM of interest resides. If a Raman amplifier exists in this opposing link, then a Raman amplifier will always exist in the same span in the link that is the same as its own. If such is the case, then a slope correction is not applied by the optical amplifier of interest. If a Raman amplifier does not exist in the link on the opposing side, then a slope correction is applied by the optical amplifier of interest. For example, if the optical amplifier PAM in the uplink at node A is the optical amplifier of interest, this optical amplifier does not apply a slope correction because a Raman amplifier RAM exists in the downlink on the opposing side. Further, if the optical amplifier PAM in the uplink at node B is the optical amplifier of interest, a Raman amplifier does not exist in the downlink on the opposing side and, hence, this optical amplifier applies a slope correction. This scheme makes it possible to maintain a flat spectrum at the input section to each optical amplifier.

Figure 8:
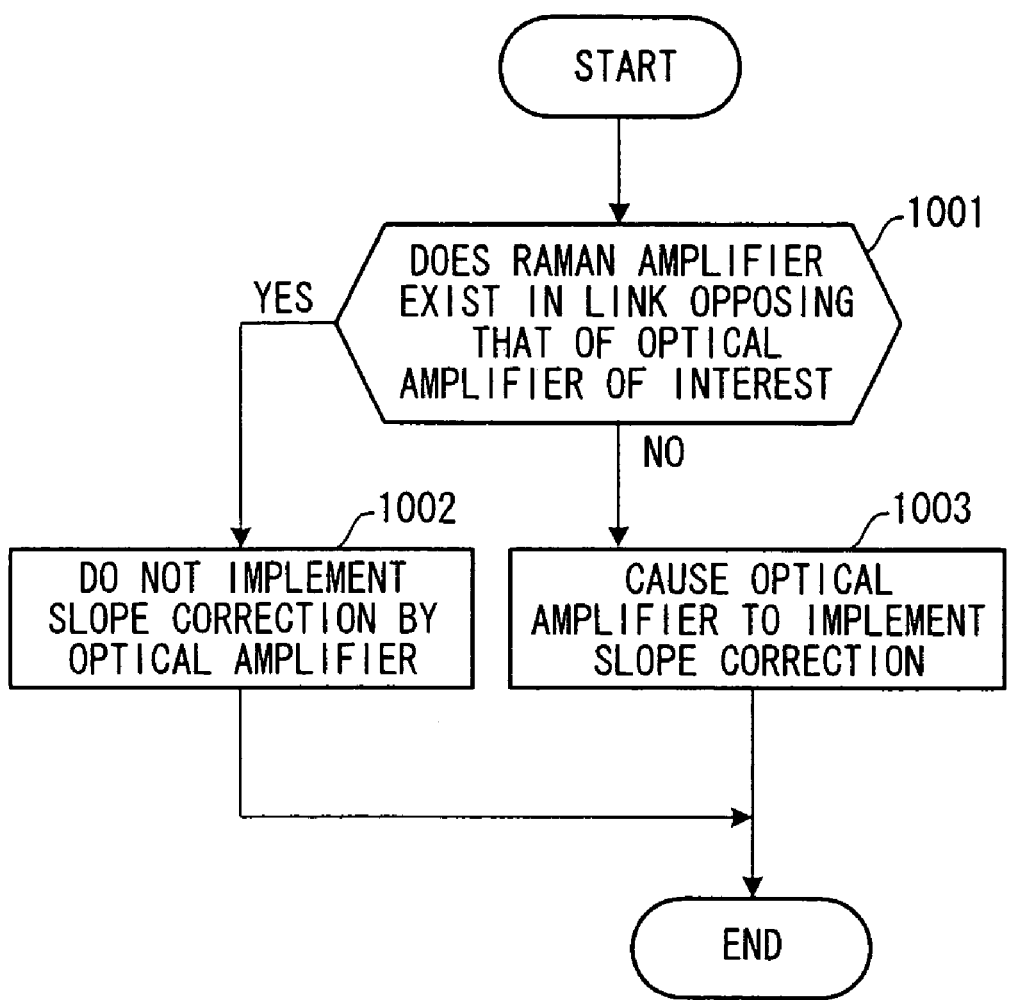
FIG. 8 is a flowchart of processing by a monitoring controller according to the first embodiment.

FIG. 8 is a flowchart of processing by the monitoring controller MNT at each node.

As shown in FIG. 8, the monitoring controller MNT checks to see whether a Raman amplifier RAM exists in the link opposing the link having an optical amplifier PAM of interest (step 1001). If the Raman amplifier RAM exists, the monitoring controller MNT instructs the optical amplifier PAM of interest not to implement slope control (step 1002). If the Raman amplifier RAM does not exist, then the monitoring controller MNT instructs the optical amplifier PAM of interest to perform slope control that will flatten the wavelength characteristic at the input section to the optical amplifier in the next stage (step 1003).

Though the details are not described here, whether or not a Raman amplifier exists can be discriminated using a monitoring control signal (described later) or an external control unit (described later).

(b) Second Embodiment

Figure 9:
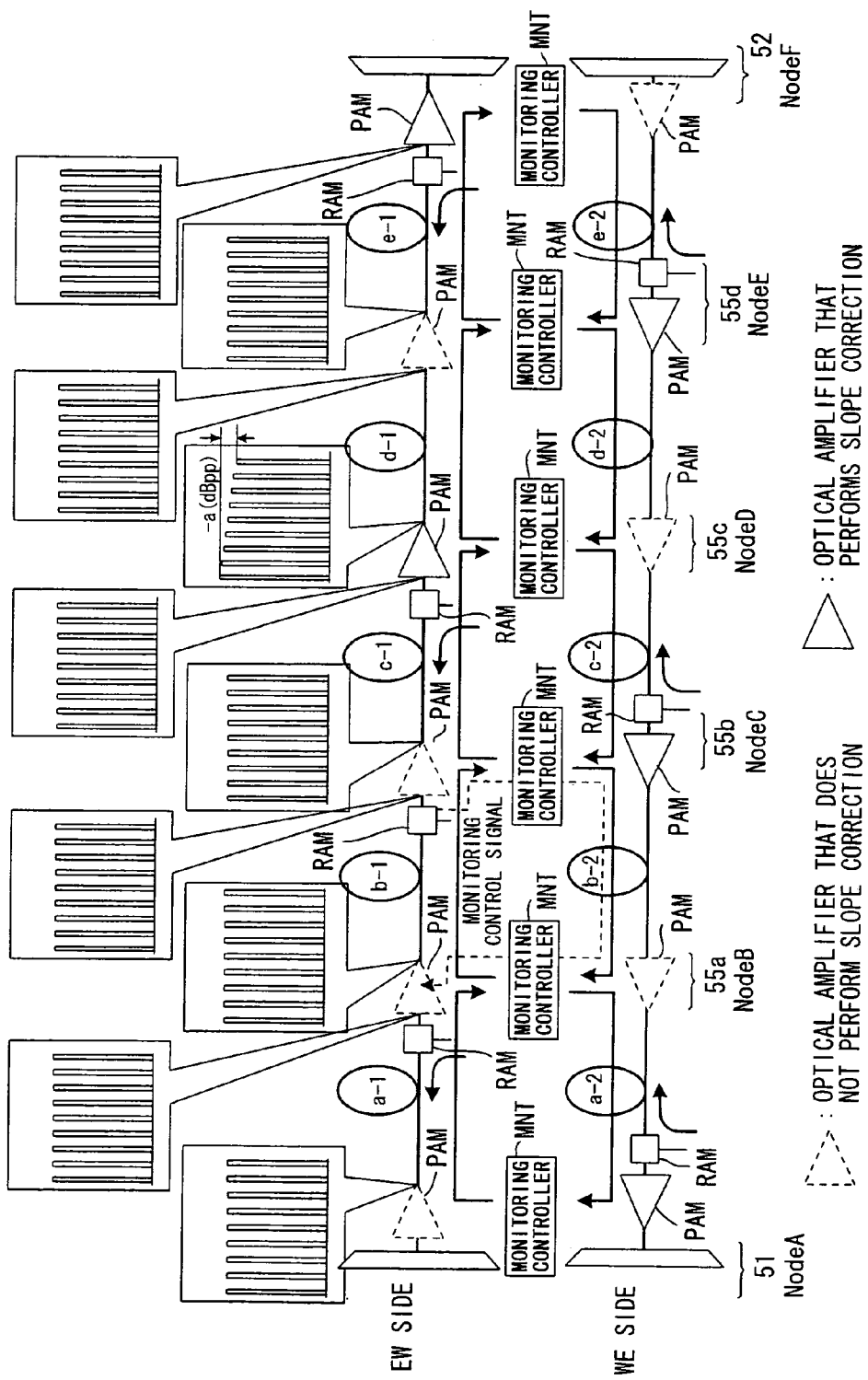
FIG. 9 is a diagram illustrating the configuration of a wavelength-division multiplexing optical communication system according to a second embodiment.

In the first embodiment, it is assumed that the distance and employed fiber of each span in the transmission line on the EW side are the same as those in the transmission line on the WE side. In rare cases, however, the distance or type of fiber in the transmission line on the EW side differs from that on the WE side, and there are also cases where Raman amplifiers are inserted along one direction only. For example, in FIG. 9, transmission line b-2 from node C to node B on the WE side does not employ a Raman amplifier, but a Raman amplifier is employed by transmission line b-1 from node B to node C on the EW side. The first embodiment is not applicable in such case. That is, whether an optical amplifier is to implement a slope correction or not cannot be decided by referring to the existence or non-existence of a Raman amplifier on the opposing side.

Accordingly, in the second embodiment, the monitoring controller MNT uses a monitoring control signal, which is sent and received by being multiplexed onto the wavelength-division multiplexed signal, to decide whether or not a slope correction is to be implemented by an optical amplifier PAM of interest at the same node as its own. More specifically, the monitoring controller MNT acquires information as to whether a Raman amplifier exists downstream of the optical amplifier PAM of interest in the same span and, as a result, decides whether or not a slope correction is to be implemented by this optical amplifier. For example, in a case where a Raman amplifier RAM exists downstream (e.g., this is the case with transmission line b-1 in FIG. 9), the optical amplifier that is the source of the transmission to this transmission line (namely the optical amplifier PAM of node B on the EW side) does not perform a slope correction. If a Raman amplifier RAM does not exist downstream (this is the case with transmission line b-2 in FIG. 9), then the optical amplifier that is the source of the transmission to this transmission line (namely the optical amplifier PAM of node C on the WE side) does perform a slope correction. Adopting this scheme makes it possible to maintain a flat spectrum at the input to each optical amplifier.

Figure 10:
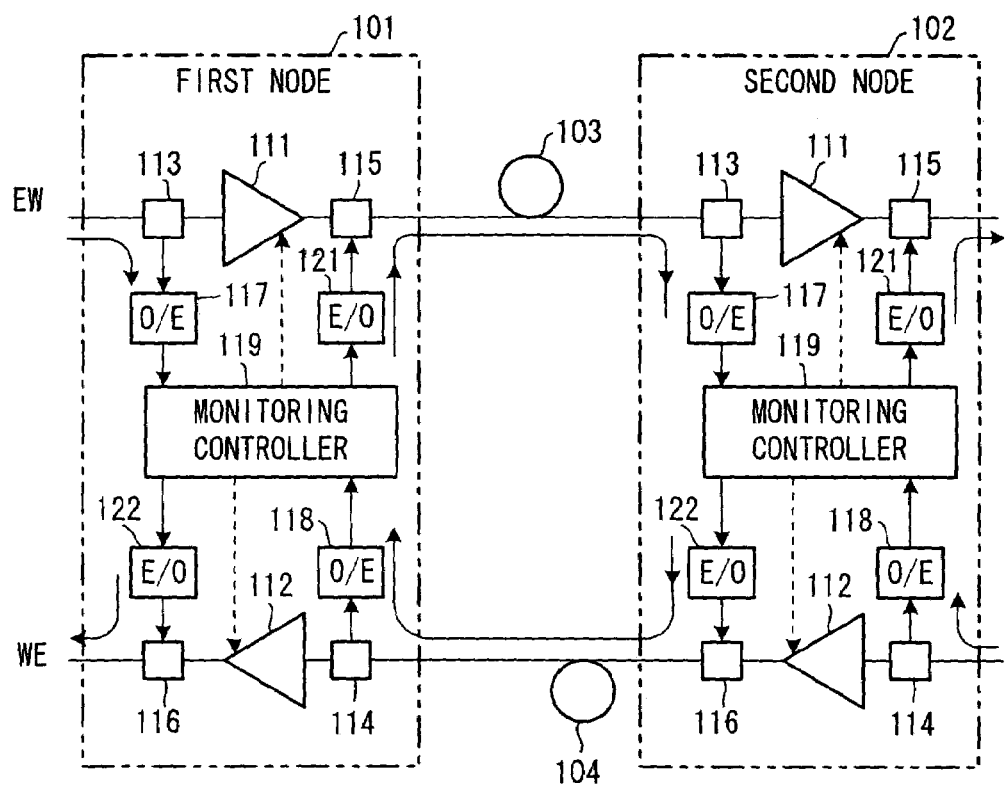
FIG. 10 is a diagram useful in describing sending and receiving of a monitoring control signal.

FIG. 10 is a diagram useful in describing the sending and receiving of the monitoring control signal. Neighboring first and second nodes 101, 102, respectively, are connected by an EW-side link (uplink) 103 and a WE-side link (downlink) 104. Each node is provided with uplink and downlink optical amplifiers 111, 112, respectively, branchers 113, 114 are provided on the input sides of the optical amplifiers 111, 112, respectively, and combiners 115, 116 are provided on the output sides of the optical amplifiers 111, 112, respectively. The branchers 113, 114 branch off light of a wavelength assigned to the monitoring control signal and input the light of this wavelength to a monitoring controller (MNT) 119 via O/E (optoelectronic) transducers 117, 118, respectively. On the basis of the monitoring control-signal received, the monitoring controller 119 exercises prescribed control, e.g., controls implementation/non-implementation of the slope correction by the optical amplifiers 111, 112. Further, the monitoring controller 119 inputs the result of monitoring and information as to the existence or non-existence of a Raman amplifier to E/O (electro-optic) transducers 121, 122 as a monitoring control signal. The E/O transducers 121, 122 convert the monitoring control signal to light of a prescribed wavelength, the combiners 115, 116 combine the main-signal light and the light of the monitoring control signal and transmit the result to the neighboring node. Though Raman amplifiers are not shown in FIG. 10, they are inserted appropriately between the branchers 113, 114 and optical amplifiers 111, 112. Whether or not a Raman amplifier exists in one link is reported by the monitoring control signal to the neighboring node via the other link.

Figure 11:
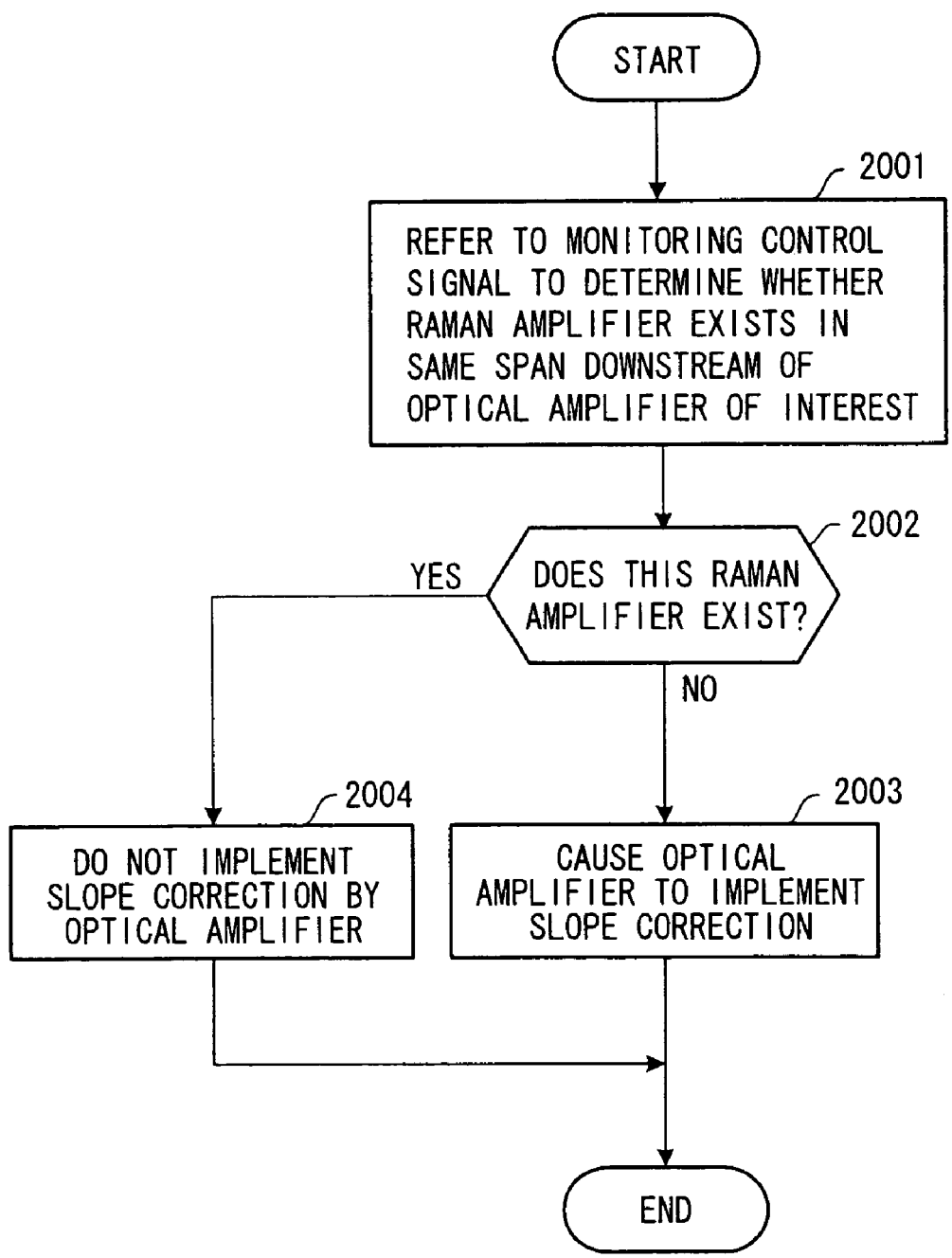
FIG. 11 is a flowchart of processing by a monitoring controller according to a second embodiment.

FIG. 11 is a flowchart of processing by the monitoring controller according to the second embodiment.

The monitoring controller MNT of each node refers to a monitoring control signal, which is sent from the link opposing the link in which the optical amplifier of interest exists, to determine whether a Raman amplifier exists downstream of the optical amplifier of interest in the same span in the node that is the same as its own (steps 2001, 2002). If the Raman amplifier does not exist, then the monitoring controller MNT instructs the optical amplifier of interest to perform slope control in order to flatten the wavelength characteristic at the input section of the optical amplifier of the next stage (step 2003). If the Raman amplifier does exist, however, then the monitoring controller MNT instructs the optical amplifier of interest not to implement slope control (step 2004).

The foregoing relates to a case where the monitoring controller MNT of each node determines whether or not a Raman amplifier on the downstream side exists by using the monitoring control signal. However, whether or not a Raman amplifier exists can also be discriminated by using an external control unit, described later.

Modification

Figure 27:
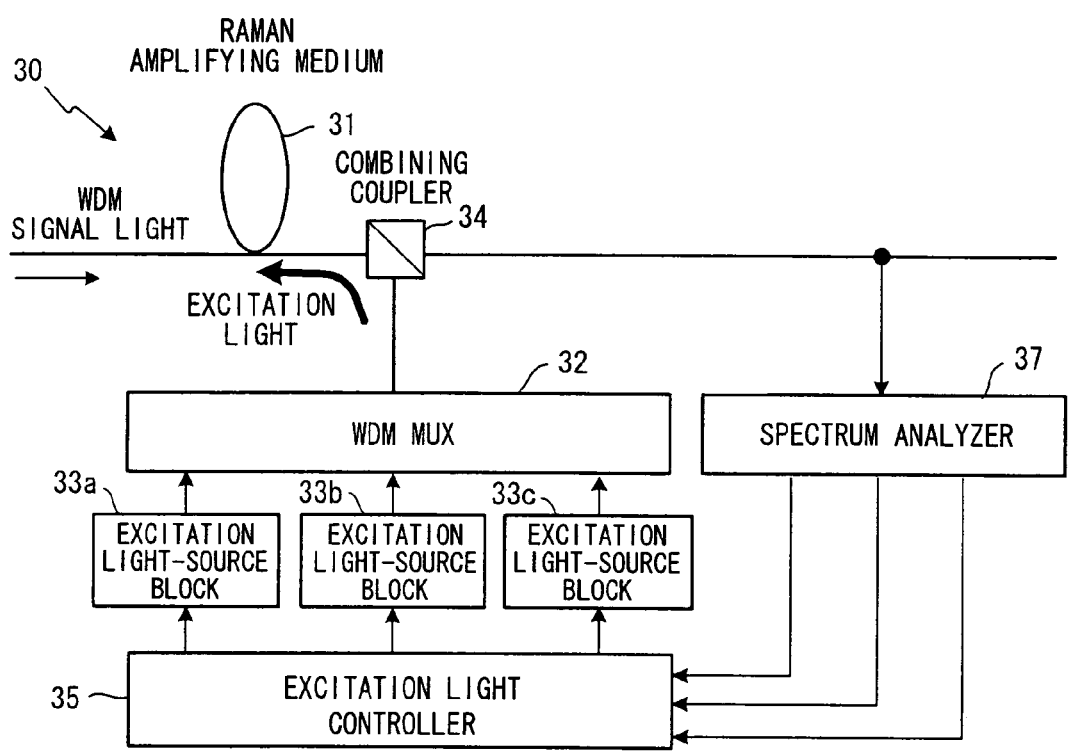
FIG. 27 is a block diagram illustrating flattening control of a Raman amplifier according to the prior art.

The second embodiment relates to a case where a Raman amplifier RAM performs a slope correction. However, the invention is applicable also to a case where flattening control is carried out. Specifically, the invention is applicable also to a case where the wavelength characteristic on the input or output side of an optical amplifier is detected by a spectrum analyzer and flattening control is performed by a Raman amplifier based upon the wavelength characteristic detected, as illustrated in FIG. 27.

Even if a Raman amplifier performs flattening control following application of a slope correction by all optical amplifiers, it is possible to flatten the spectrum that is input to the optical amplifier of each node. However, there is a possibility that a slope correction by an optical amplifier will cause a decline the optical SNR characteristic. Accordingly, it is possible to use a monitoring control signal in a manner similar to that of the second embodiment so as to instruct an optical amplifier that does not need to apply a slope correction to refrain from applying the correction.

Figure 12:
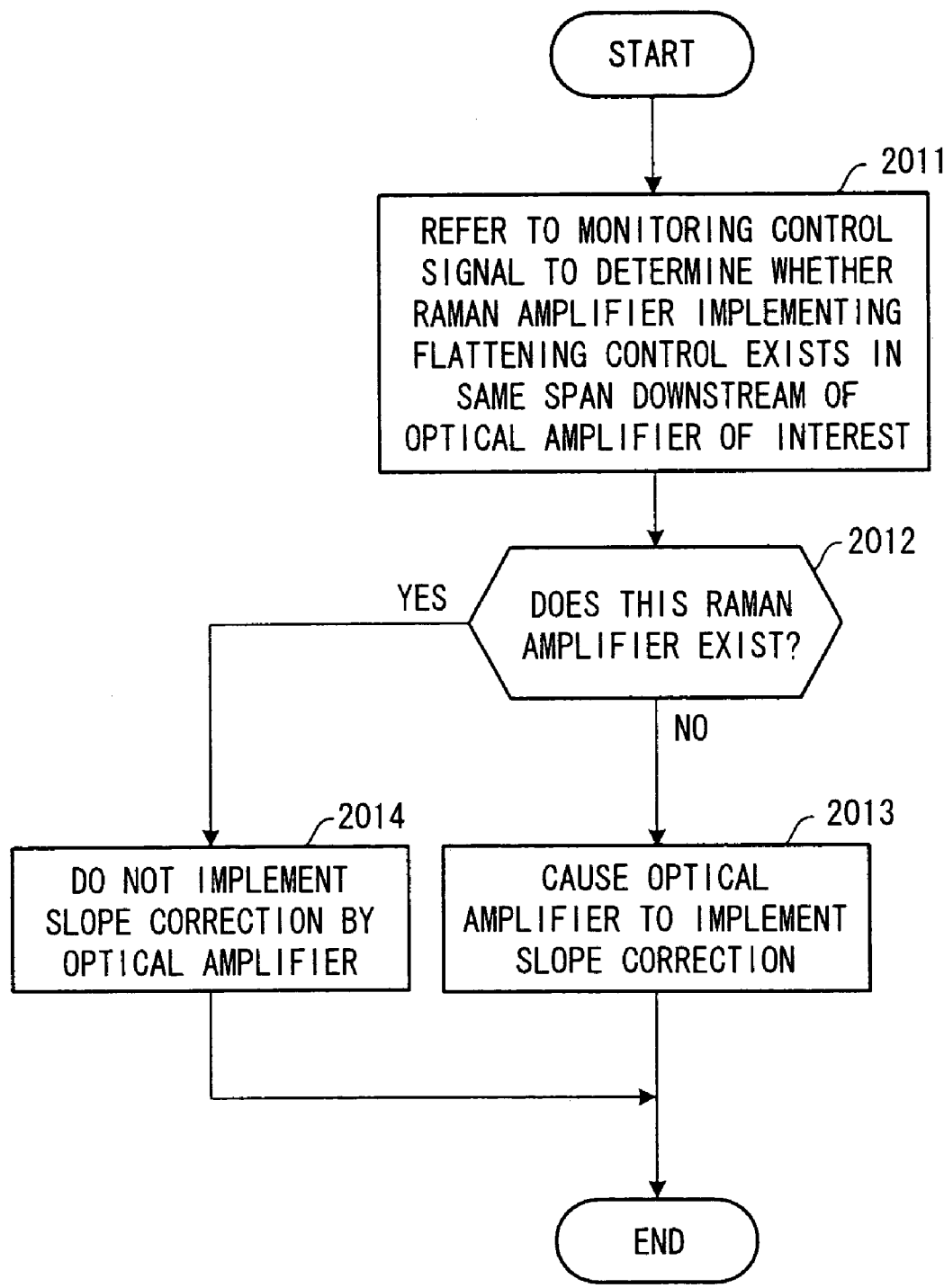
FIG. 12 is a flowchart of processing by a monitoring controller according to a modification of the second embodiment.

Specifically, as shown in FIG. 12, the monitoring controller MNT determines, from the monitoring control signal, whether a Raman amplifier in a node downstream of the optical amplifier of interest is performing flattening of a wavelength characteristic based upon the wavelength characteristic on the input or output side of the optical amplifier connected to this Raman amplifier (steps 2011, 2012). On the basis of the state of implementation of flattening control at this Raman amplifier, the monitoring controller MNT instructs the optical amplifier of interest whether or not to implement a slope correction. (steps 2013, 2014).

(B) Situation in Which Amount of Slope correction by Optical Amplifiers is Limited Slope compensation control at an optical amplifier requires more excitation light in comparison with a case where slope compensation control is not carried out. For this reason, there are instances where the amount of slope correction is limited in order to give priority to an improvement in noise figure. In a case such as this, the shortfall in the slope correction is compensated for by optical pre-emphasis control. However, situations in which this compensation is inadequate may occur owing to a limitation upon amount of attenuation of an optical attenuator at the transmitting end and upon the input dynamic range of the amplifier of the transmitted light. In a system that uses a Raman amplifier, this problem can be dealt with by minimizing accumulation of tilt through a third embodiment, described below.

Figure 13:
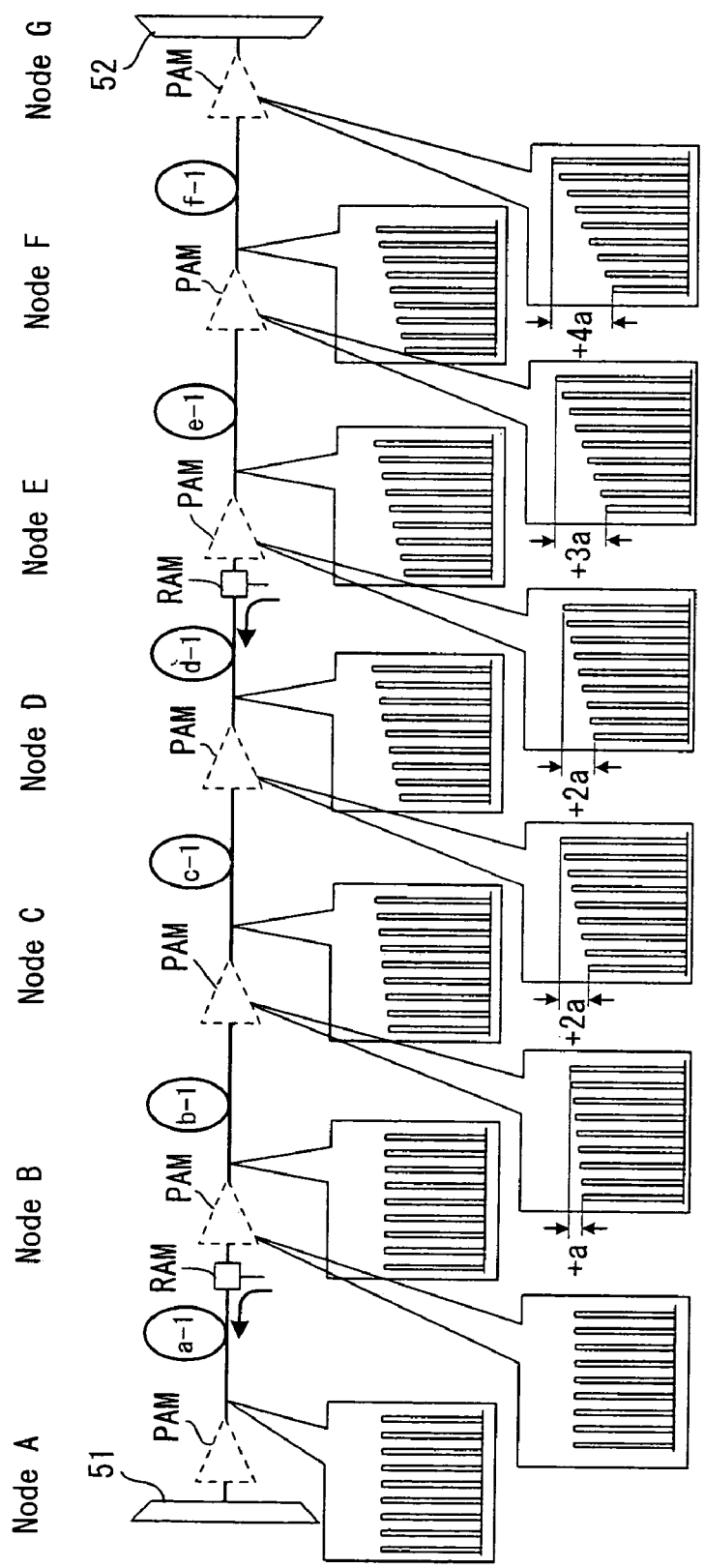
FIG. 13 is a diagram useful in describing spectrums in a case where a slope correction is performed solely by a Raman amplifier.
Figure 14:
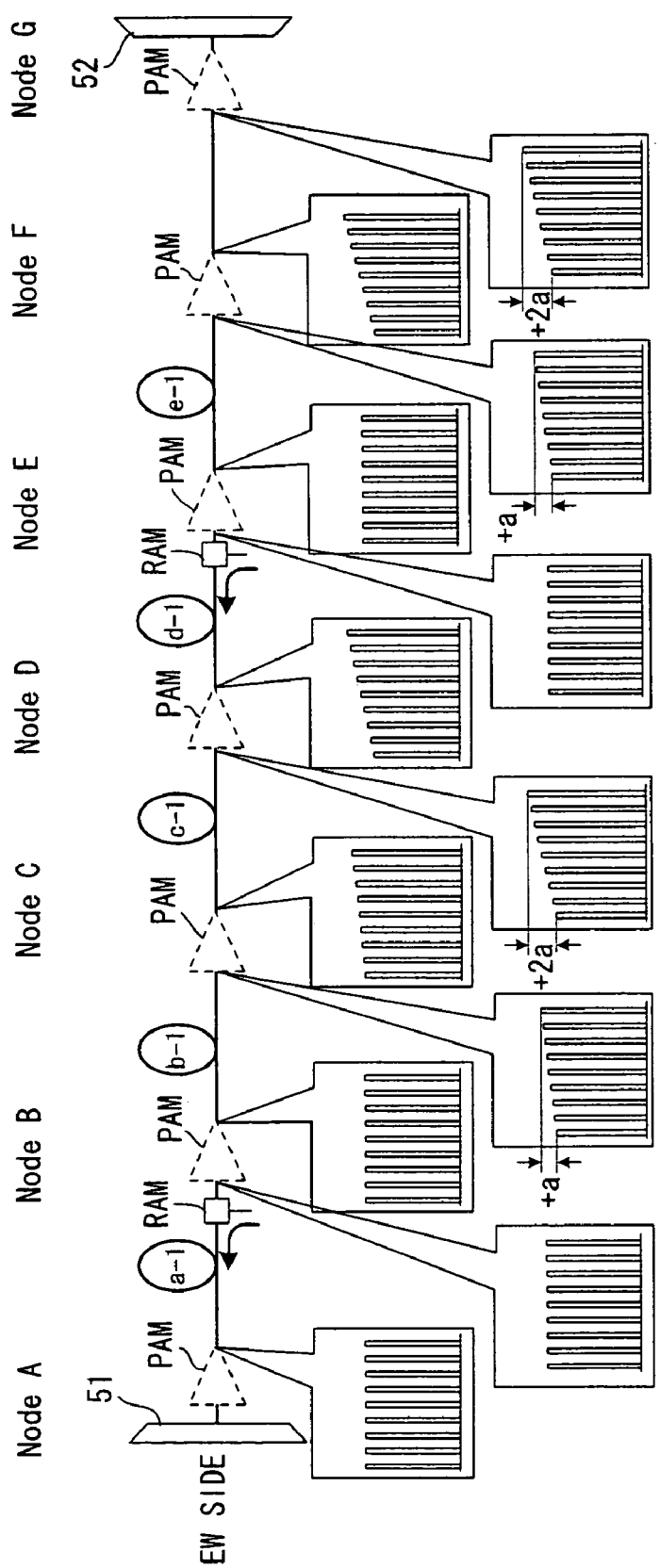
FIG. 14 is a diagram useful in describing spectrums in a case where flattening control is performed solely by a Raman amplifier.

FIG. 13 illustrates amounts of tilt at the input and output sections of each optical amplifier PAM in a case where the optical amplifiers PAM do not apply a slope correction in order to give priority to the noise-figure characteristic, and only Raman amplifiers RAM of nodes B and E perform slope compensation in transmission lines a-1 and d-1. FIG. 14 illustrates amounts of tilt at the input and output sections of each optical amplifier PAM in a case where the optical amplifiers PAM do not apply a slope correction in order to give priority to the noise-figure characteristic, and only Raman amplifiers RAM of nodes B and E perform flattening control (feedback control). In the cases of both FIGS. 13 and 14, the spectrum at the input section of each optical amplifier will not be flattened and a large interchannel variation (tilt) will accrue at the receiving end 52.

In a situation such as this, an effective method is to have an external control unit provided at, e.g., the transmitting or receiving end, ① acquire, from the monitoring control signal, information as to whether or not a Raman amplifier exists at each node and information concerning the distance between Raman amplifiers, these items of information pertaining to the entire system; ② calculate from this information the total amount of tilt of the transmission line produced from each Raman amplifier to the node at which the next Raman amplifier exists or to the receiving end; and ③ find the amount of slope correction that will compensate for this amount of tilt and indicate this amount of slope correction to the Raman amplifier, whereby the slope correction is applied.

(a) Third Embodiment

Figure 15:
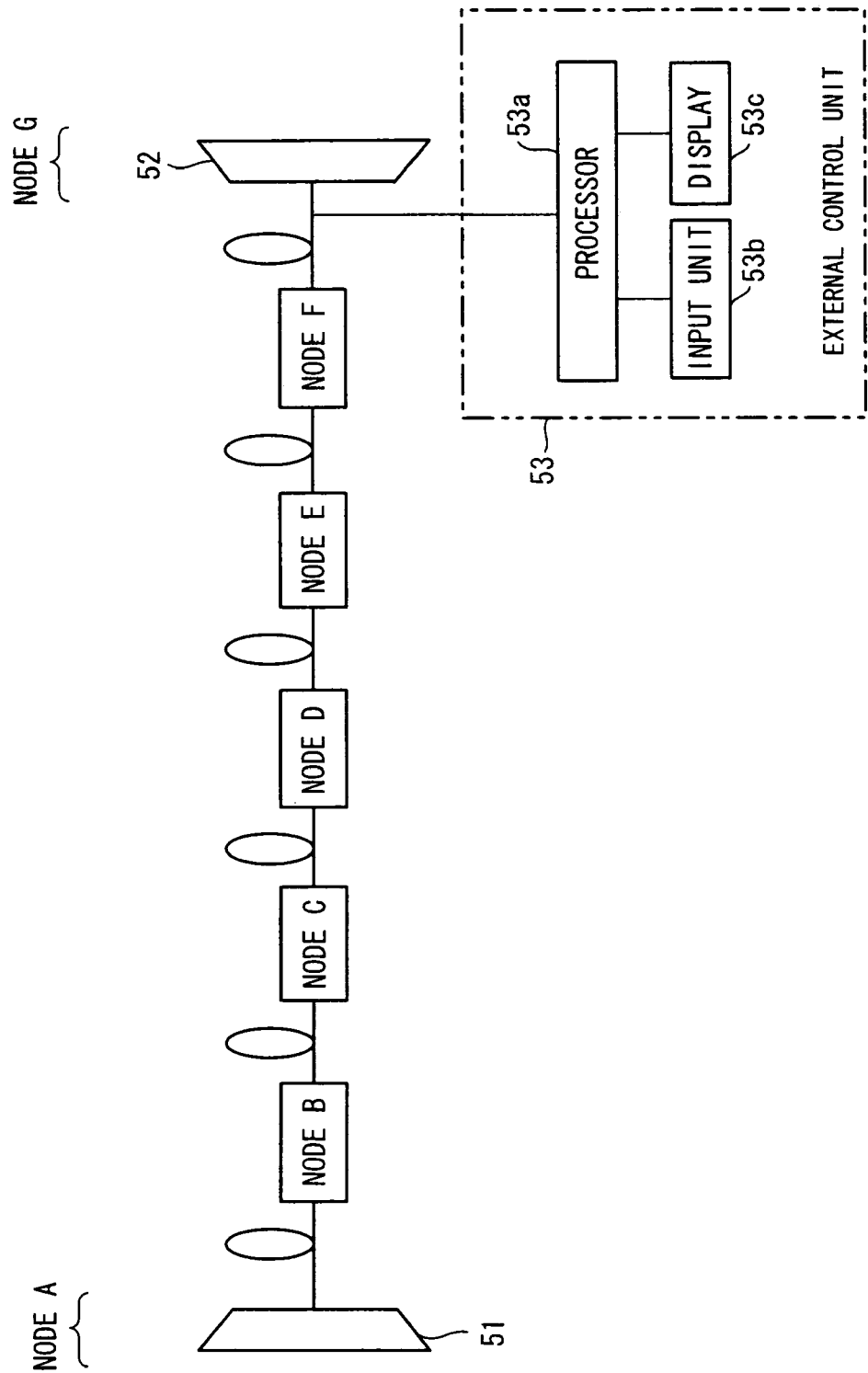
FIG. 15 is a diagram illustrating the configuration of a wavelength-division multiplexing optical communication system according to a third embodiment having an external control unit.

FIG. 15 is a diagram illustrating the configuration of a wavelength-division multiplexing optical communication system according to a third embodiment having an external control unit. Here nodes B to F that function as repeater stations are provided between the transmitting end 51 (node A) and receiving end 52 (node G). Each node is capable of transmitting and receiving the monitoring control signal in the manner shown in FIG. 10, and information regarding the absence or presence of a Raman amplifier and information concerning the distance to the next Raman amplifier is transmitted using the monitoring control signal. An external control unit 53 receives the monitoring control signal sent via the uplink, places various commands on the monitoring control signal via the downlink and can instruct each node as to the operation to be performed thereby. The external control unit 53 includes a processor 53a, an input unit 53b and a display unit 53c.

Figure 16:
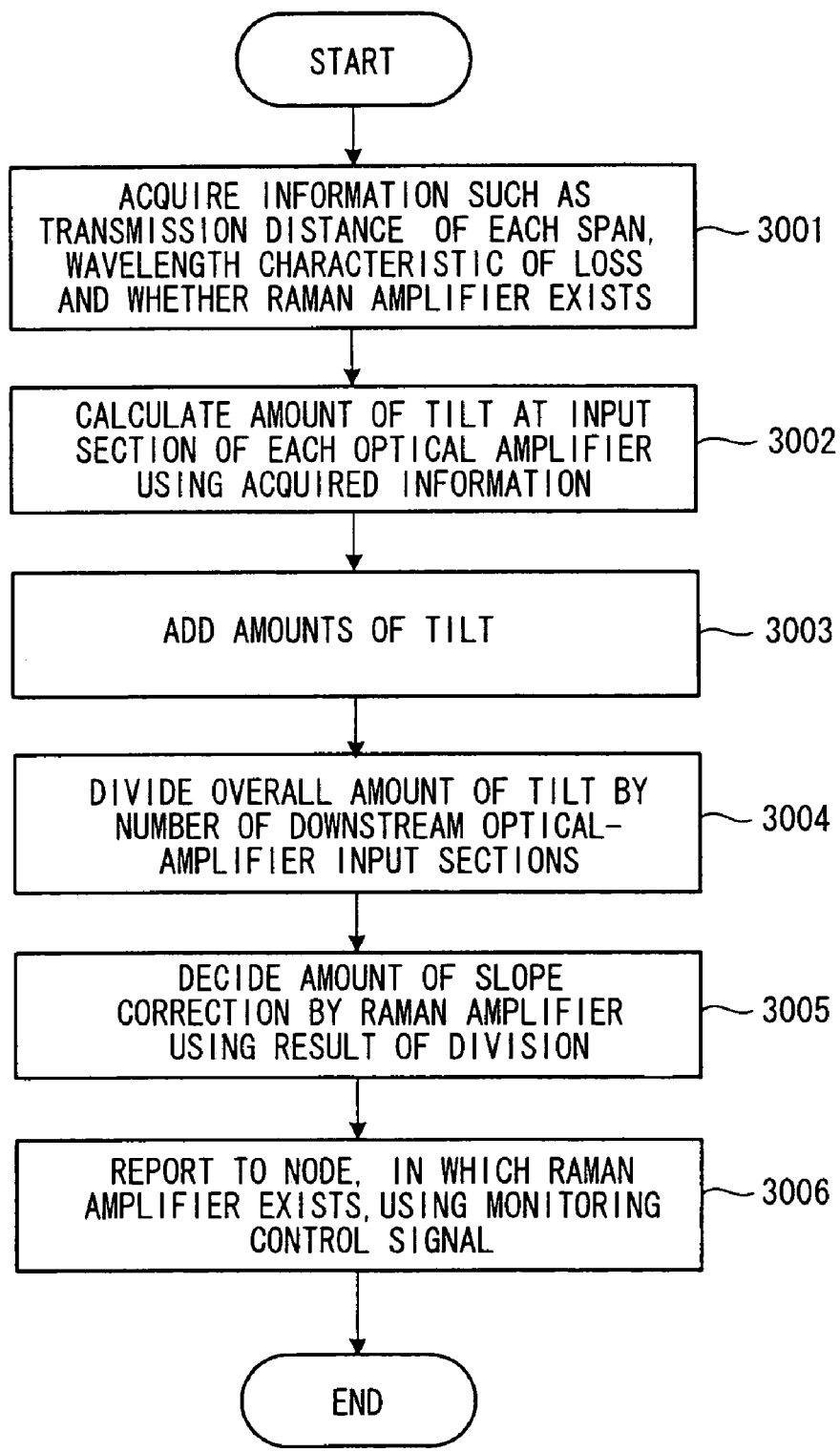
FIG. 16 is a flowchart of processing for deciding amount of slope correction by each Raman amplifier in a case where the amount of slope correction by an optical amplifier is zero.

FIG. 16 is a flowchart of processing for deciding amount of slope correction by each Raman amplifier in a case where the amount of slope correction by an optical amplifier is zero. It is assumed that each Raman amplifier has already corrected for tilt in the span to which it belongs.

The external control unit 53 acquires information such as the transmission distance of each span, wavelength-dependent loss and whether or not a Raman amplifier exists from the monitoring control signal (step 3001) and calculates an amount of tilt (dBpp) at the input section of each optical amplifier using these items of information (step 3002).

Next, the external control unit 53 adds the amounts of tilt of the wavelength characteristics at the input sections of each of the optical amplifiers PAM (step 3003).

If the amount of tilt at the input section of each optical amplifier PAM has been found, then the external control unit 53 divides the obtained overall amount of tilt by the number of input sections of the optical amplifiers present downstream of the Raman amplifier that applies compensation (step 3004). The external control unit 53 then inverts the sign of the value calculated, adds the value to the original amount of slope correction by the Raman amplifier and calculates the total amount of slope correction (step 3005). Then, using the monitoring control signal, the external control unit 53 reports the total amount of slope correction to the node where the Raman amplifier of interest exists (step 3006).

The processing set forth above will be described in detail in a case where nodes B and E are provided with a Raman amplifier RAM having a slope compensating function, as shown in FIG. 13. It will be assumed that tilt of the wavelength characteristic in each span is +a dBpp, and that each Raman amplifier RAM is initially set so as to apply a slope correction of −a dBpp.

1) The amount of tilt at the input section of each optical amplifier PAM is as follows (it is assumed that node A always has a tilt amount of zero and therefore is not included in the calculations):

B: 0 dBpp; C: +a dBpp; D: +2a dBpp;

E: +2a dBpp; F: +3a dBpp; G: +4a dBpp

2) The overall amount of tilt of nodes B to F is 0+a+2a+2a+3a+4a=12a dBpp.

3) The number of input sections of optical amplifiers PAM downstream of the Raman amplifier RAM in node B is six. When 12a dBpp is divided by this number, the result is 2a dBpp.

Figure 17:
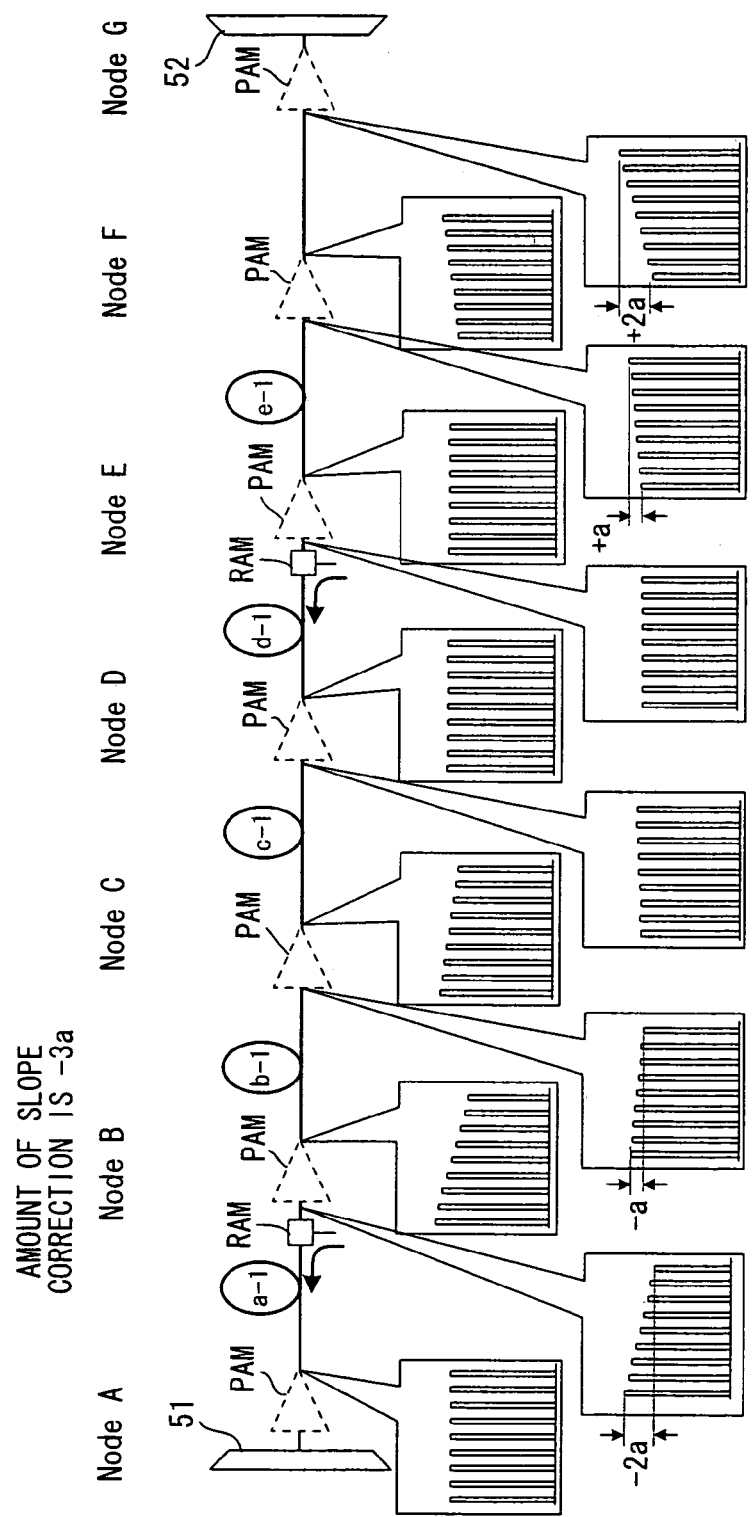
FIG. 17 is a diagram useful in describing spectrums according to a third embodiment.

4) The amount of slope correction by the Raman amplifier of node B is −a dBpp and −2a is added to this value to obtain −3a dBpp. The value of −3a dBpp is the amount of slope correction by the Raman amplifier of node B. The external control unit 53 calculates the amount of slope correction by the Raman amplifier of node B in the manner described above and reports this to node B by the monitoring control signal. In response, the monitoring controller MNT of node B instructs the Raman amplifier RAM to multiply by the slope correction of −3a dBpp. As a result, the tilt characteristics at the input and output sections of each optical amplifier is as illustrated in FIG. 17, and tilt at the receiving end 52 is reduced in comparison with FIG. 13.

Though the spectrum at the input section to each optical amplifier still exhibits tilt, the average values of the input levels of respective ones of the channels in the longitudinal direction are all equal (0 dBpp) and averaging occurs in terms of optical SNR as well. This method means that the Raman amplifier performs pre-emphasis control taking only the slope component into account before optical pre-emphasis control of each channel is carried out.

(b) Modification

The method of the third embodiment is applicable also to any Raman amplifier in the system, and the amount of slope correction by the Raman amplifier RAM of node E can be decided. In this case, the divisor in 3) above would be 3 because this is the number of downstream input sections.

Further, the method of the third embodiment is also applicable to a case where the amount of slope correction by each optical amplifier is a fixed value and not zero and a correction shortfall occurs. That is, when the amount of tilt at the input section of each optical amplifier is calculated, it will suffice to calculate the amount of tilt by subtracting the amount of slope correction applied by the upstream optical amplifiers.

Further, if the input section or output section of each node has a spectrum analyzer, the values cited in 1) and 2) above can be found not by calculation but by approximating the amount of slope from the directly measured optical power level of each channel.

Furthermore, even if a spectrum analyzer is not provided in all nodes, it is possible to find the amount of slope by predicting and approximating the spectrums at nodes devoid of the spectrum analyzer based upon the optical power levels of the nearest nodes having a spectrum analyzer. For example, if we let s1, s2 represent the spectrums of wavelength λ at first and second nodes, let D represent the distance between these nodes and let d represent the distance between the first node and a third node located between the first and second nodes, then a spectrum s3 of wavelength λ at the third node can be found by interpolation using the following equation:

$$s3=s1+d(s2-s1)/D \tag{1}$$

Further, the method of the third embodiment is premised on compensation by a Raman amplifier at only a single location. However, there is a possibility that a situation will arise in which compensation is inadequate. In such case the amount of slope correction can be dispersed to other Raman amplifiers in the system.

The above processing is applicable also to a case where the amount of slope correction by each optical amplifier is not zero. If the amount of slope correction is not zero, then the amount of tilt at the input section of an optical amplifier located in the same node as that of the Raman amplifier will be a value obtained by subtracting the amount of slope correction by each optical amplifier from the overall amount of tilt that would result if the amount of slope correction by each optical amplifier were zero.

Further, the third embodiment relates to a case where a Raman amplifier possesses only a slope compensating function. However, a Raman amplifier can be provided with the flattening control function (see FIG. 27) in addition to the slope compensating function. In a node in which a Raman amplifier having the flattening control function exists, the amount of tilt at the input section of the optical amplifier can be measured and calculated by a spectrum analyzer. The monitoring controller of this node would report the measured amount of tilt to the external control unit 53 by the monitoring control signal.

(C) Situation in Which Amount of Slope Correction by Both Optical Amplifiers and Raman Amplifiers is Limited A scheme in which an inadequate amount of slope correction is accommodated for solely by a Raman amplifier in a system has been proposed above. However, a situation where compensation is inadequate owing to a limitation upon correction by Raman amplifiers or a situation where, conversely, optical amplifiers have leeway for a slope correction also is conceivable. A case where a slope correction is performed by both optical amplifiers and Raman amplifiers and, moreover, there is a limitation upon the amount of slope correction is the most general form of a control scheme in situations of the kind described above. A fourth embodiment flattens tilt upon deciding amount of slope correction by optical amplifiers and Raman amplifiers in this case.

(a) Fourth Embodiment

Figure 18:
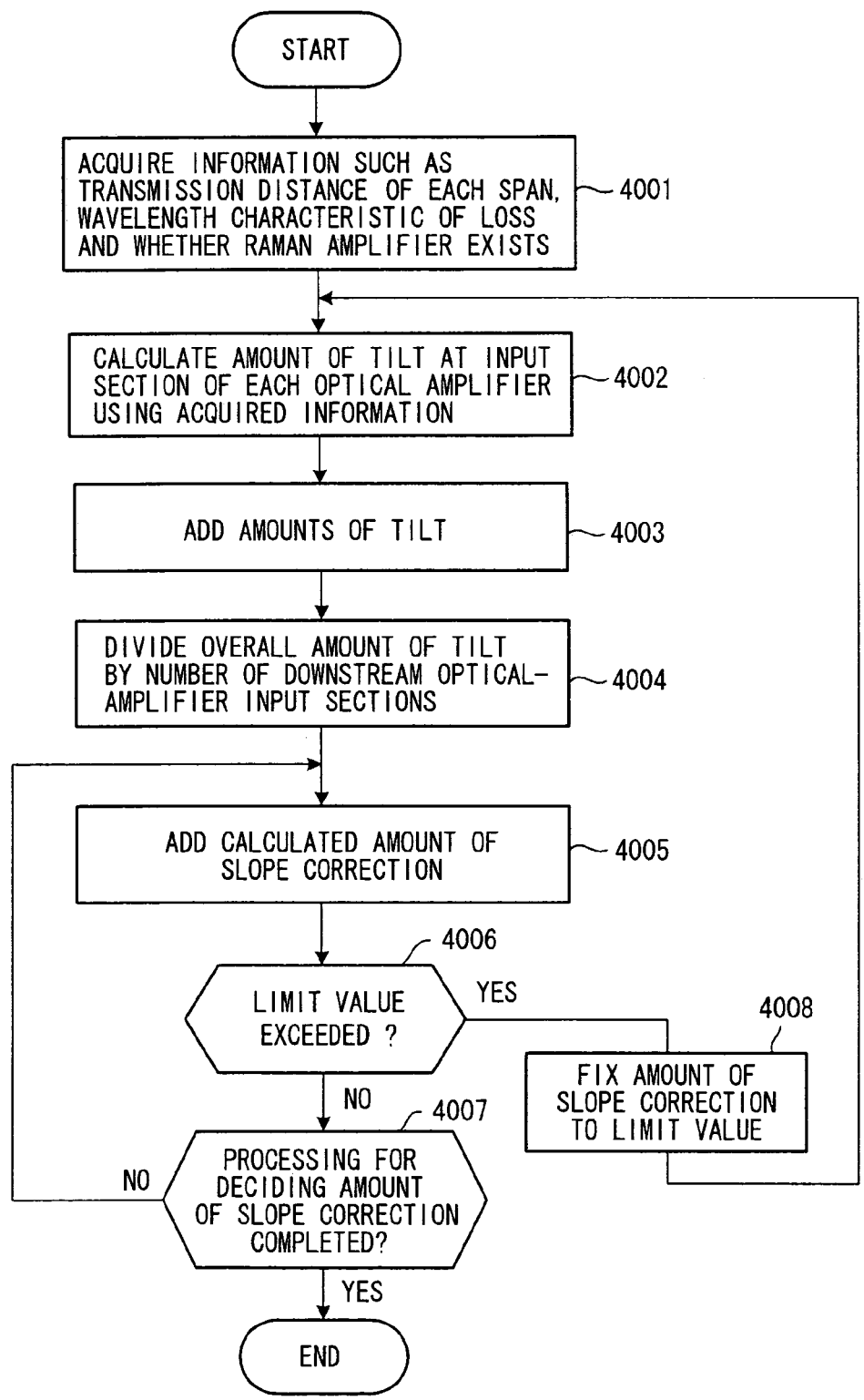
FIG. 18 is a flowchart of processing for deciding amount of slope correction by an optical amplifier and Raman amplifier in a fourth embodiment.

The wavelength-division multiplexing optical communication system has the configuration shown in FIG. 15 in the case of the fourth embodiment as well. FIG. 18 is a flowchart of processing for deciding amount of slope correction by an optical amplifier and Raman amplifier in the fourth embodiment.

The external control unit 53 acquires information such as the transmission distance of each span, wavelength-dependent loss, the amount of slope correction by optical amplifiers and the amount of slope correction by Raman amplifiers (step 4001) and calculates the amount of tilt (dBpp) at the input section of each optical amplifier using these items of information (step 4002). The external control unit 53 then calculates the overall amount of the tilt calculated (step 4003) and divides the overall amount of tilt by the number of input sections of the optical amplifiers and of the Raman amplifiers on the downstream side from the upstream side (step 4004).

The external control unit 53 then inverts the sign of the value that was calculated at step 4004 and adds the value to the amount of slope correction by the upstream-side optical amplifier and Raman amplifier as the amount of slope correction (step 4005).

The external control unit 53 determines whether this amount of slope correction has exceeded the capability of the optical amplifier or Raman amplifier (step 4006). If the amount of slope correction does not exceed capability, the external control unit 53 determines whether the decision concerning amount of slope correction has been completed for all optical amplifiers and Raman amplifiers (step 4007). If the answer is "NO", then control returns to step 4005 and amount of slope correction continues to be assigned to optical amplifiers and Raman amplifiers.

If it is found at step 4006 that the amount of slope correction exceeds the limit amount of correction of a prescribed optical amplifier or Raman amplifier, then the external control unit 53 fixes the amount of slope correction of this optical amplifier or Raman amplifier at the limit value (the amount of slope correction possible) (step 4008). The external control unit 53 thenceforth shifts the target of slope correction downstream by one optical amplifier or Raman amplifier and repeats control from step 4002 onward.

An example of this control will be described in accordance with Equation 19. The optical amplifiers and Raman amplifiers exhibit the following limitations:

The optical amplifier at node A is limited to a correction of −0.5a dBpp with respect to a required amount of tilt control of −a dBpp.

The Raman amplifier at node C is limited to a correction of −0.5a dBpp with respect to a required amount of tilt control of −a dBpp.

The optical amplifier at node E is limited to a correction of 0 dBpp with respect to a required amount of tilt control of −a dBpp.

The optical amplifier at node B is limited to a possible amount of tilt of −0.5a dB The optical amplifier at node C is limited to a possible amount of tilt of −1.5a dB.

Figure 19:
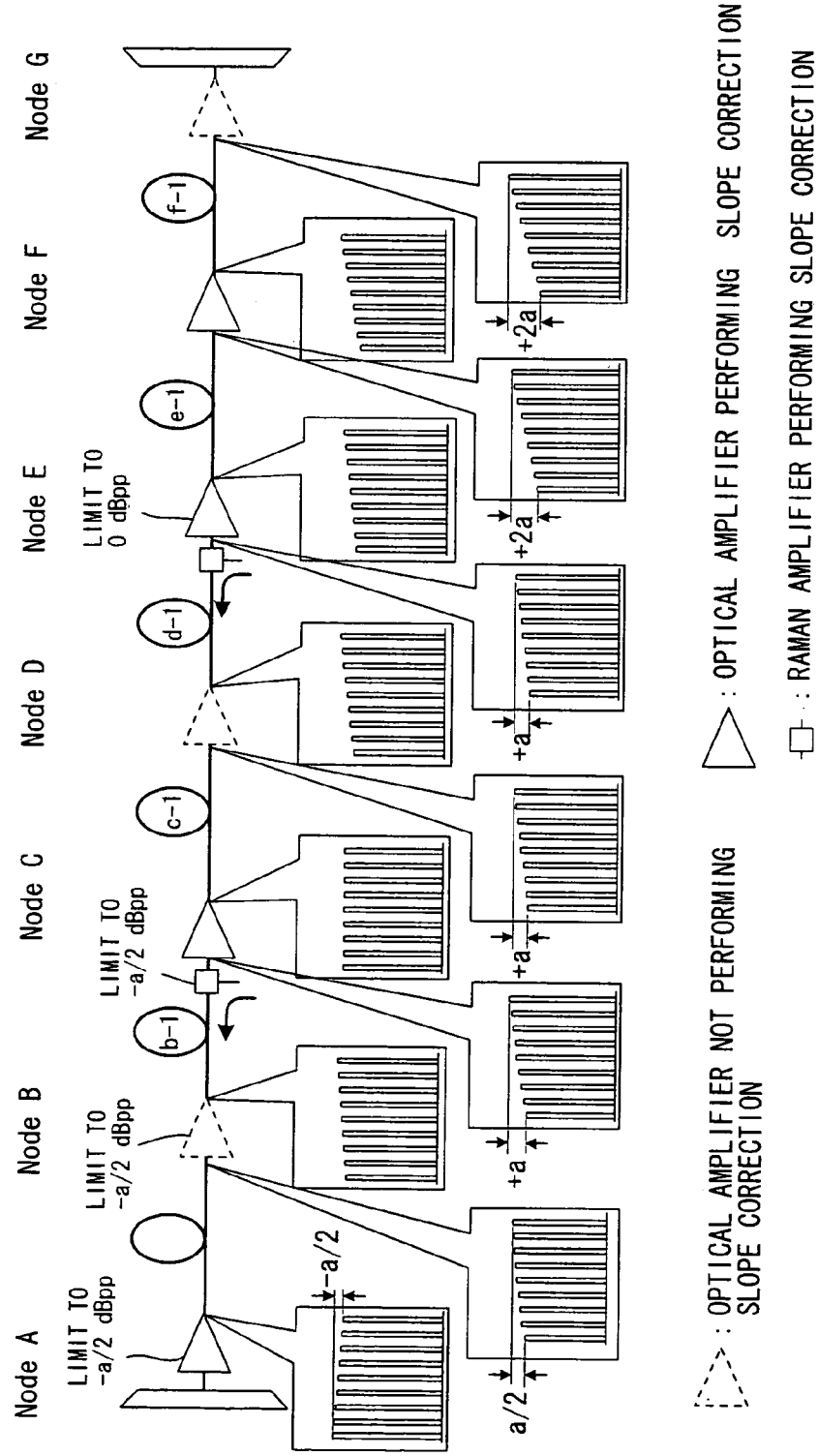
FIG. 19 is a spectrum diagram (before amount of slope correction is decided) in a case where there is a limitation upon optical amplifiers and Raman amplifiers.

As indicated by the wavelength characteristics shown in FIG. 19, the input to each optical amplifier is not flattened owing to the limitation on amount of slope correction of each optical amplifier and Raman amplifier, and therefore the deviation appears at the receiving end as is. This is dealt with by the control described below. It should be noted that since a slope correction of the full limit is being applied to the Raman amplifiers, it is unnecessary to take the Raman amplifiers into consideration in the control described below.

1) The amount of tilt at each node is calculated as follows:
Node B: 0.5a dBpp; Node C: a dBpp;
Node D: a dBpp; Node E: a dBpp;
Node F: 2a dBpp; Node G: 2a dBpp 2) These amounts of tilt are added to give 7.5a dBpp.

3) Since the optical amplifier at node A is already at its limit, compensation by the optical amplifier of node B will be considered. The number of optical-amplifier input sections downstream of the optical amplifier in node B is five and therefore the value from 2) above is divided by 5, which gives −1.5 dBpp. However, since the amount of slope correction by the optical amplifier of node B is limited at −0.5a dBpp, the correction is fixed at −0.5a dBpp and the target of the tilt compensation control is shifted to the optical amplifier at node C.

4) At this time the amount of tilt of each optical amplifier is calculated again.
Node B: 0.5a dBpp; Node C: 0.5a dBpp;
Node D: 0.5a dBpp; Node E: 0.5a dBpp;
Node F: 1.5a dBpp; Node G: 1.5a dBpp 5) These amounts of tilt are added to give 5a dBpp.

6) The number of optical-amplifier input sections downstream of the optical amplifier in node C is four and therefore the value from 5) above is divided by 4, which gives −1.25a dBpp. However, the amount of slope correction by the optical amplifier of node C is limited at 1.5a dBpp and a slope correction of −a dBpp is already being applied. A slope correction of −2.25a dBpp in total, therefore, is impossible. Accordingly, the amount of slope correction by the optical amplifier at node C is fixed at −1.5a dBpp and the target of the tilt compensation control is shifted to the optical amplifier of node D.

7) At this time the amount of tilt of each optical amplifier is calculated again.
Node B: 0.5a dBpp; Node C: 0.5a dBpp;
Node D: 0 dBpp; Node E: 0 dBpp;
Node F: a dBpp; Node G: a dBpp 8) These amounts of tilt are added to give 3a dBpp.

9) The number of optical-amplifier input sections downstream of the optical amplifier in node D is three and therefore the value from 8) above is divided by 3, which gives −a dBpp. The optical amplifier at node D has the original amount of slope correction of 0 dB and there is no limitation. This means that slope compensation of −a dB is possible. Control of slope correction ends at this point in time.

Figure 20:
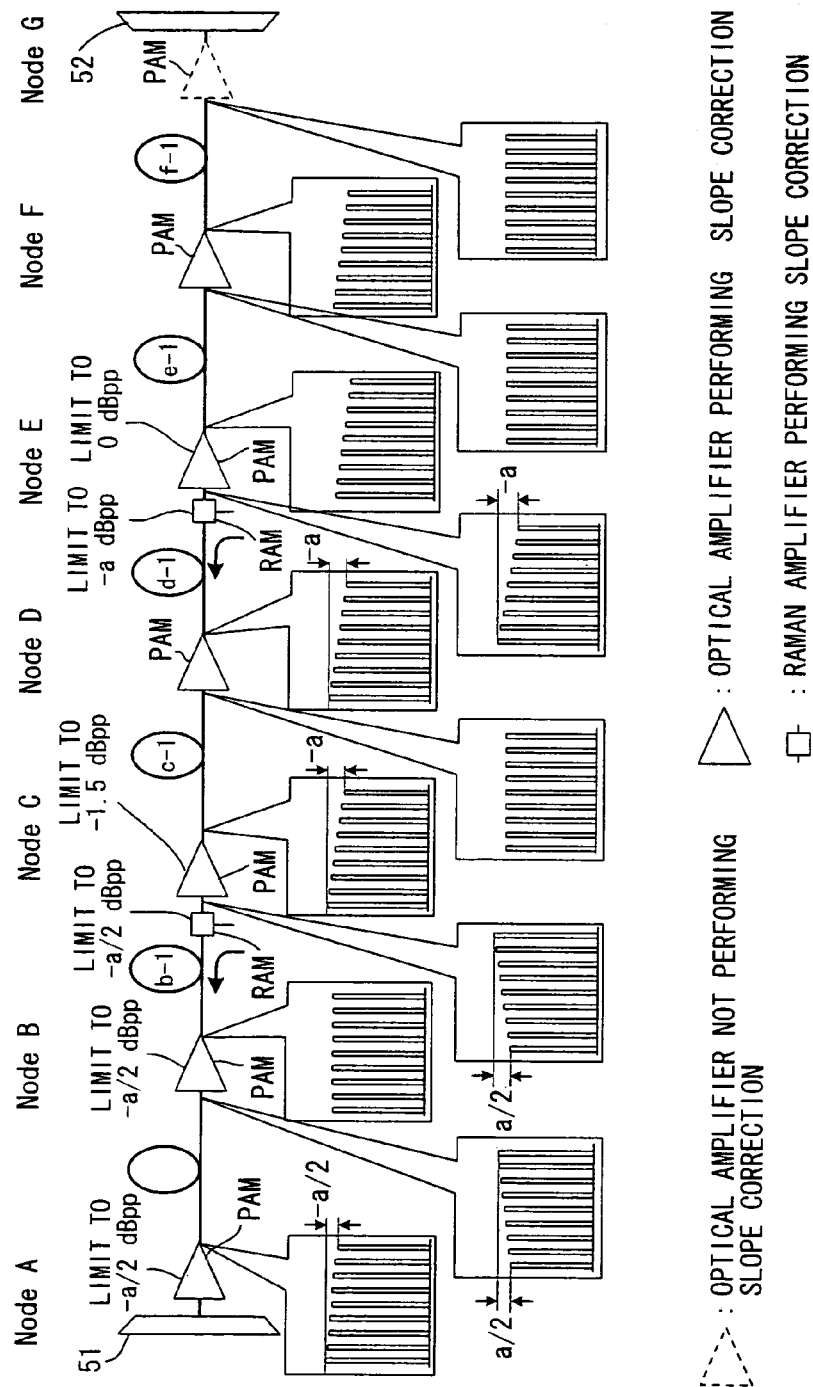
FIG. 20 is a spectrum diagram (after amount of slope correction is decided) in a case where there is a limitation upon optical amplifiers and Raman amplifiers.

A diagram of wavelength spectrum characteristics at the moment control of slope correction ends is as shown in FIG. 20. The output of tilt at the input of each optical amplifier is as follows:
Node B: 0.5a dBpp; Node C: 0.5a dBpp;
Node D: 0 dBpp; Node E: −a dBpp;
Node F: 0 dBpp; Node G: 0 dBpp If the amounts of tilt of respective ones of the input sections are added, we have 0.5a+0.5a+0−a+0+0=0 dBpp. It will be understood that the input levels to the optical amplifiers are averaged and that the optical SNR characteristics are averaged as well. Using this scheme makes it possible to achieve the optimum state in terms of optical SNR while subjecting pre-emphasis to as little load as possible.

The above example assumes a transmission-line pattern in which the distances of each of the transmission lines are all the same. However, the invention is applicable also in a case where the distances of the transmission lines are different from one another (i.e., a case where the amount of tilt differs for every transmission line).

Further, the fourth embodiment relates to a case where the Raman amplifiers have only a slope compensating function. However, a Raman amplifier can be provided with the flattening control function (see FIG. 27) in addition to the slope compensating function. In a node in which a Raman amplifier having the flattening control function exists, the amount of tilt at the input section of the optical amplifier can be measured and calculated by a spectrum analyzer. The monitoring controller of this node would report the measured amount of tilt to the external control unit 53 by the monitoring control signal. Slope compensation control of Raman amplifiers in a case where the flattening control function is provided in addition to the slope compensating function is similar to that shown in FIG. 19.

Further, even if a spectrum analyzer is not provided in all nodes, it is possible to find the spectrum of a node devoid of the spectrum analyzer, based upon the optical power levels of the nearest nodes having a spectrum analyzer, by interpolation using Equation (1).

Figure 21:
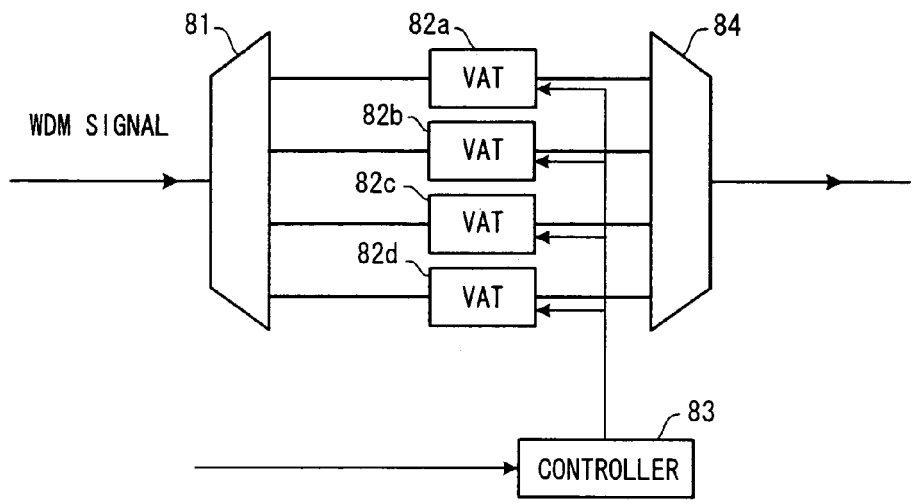
FIG. 21 is a diagram showing the structure of a gain equalizer.
Figure 22:
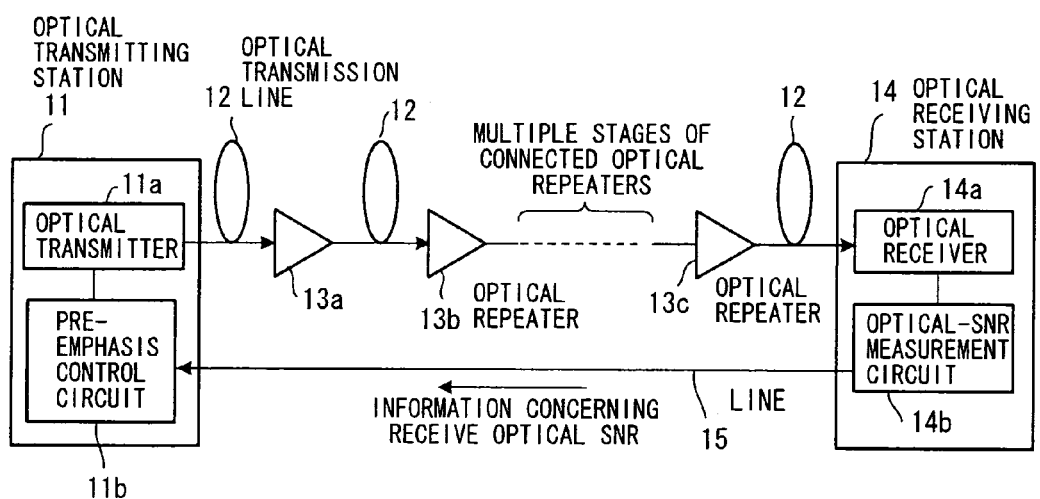
FIG. 22 is a diagram useful in describing optical pre-emphasis control according to the prior art.

A slope correction is applied above using optical amplifiers and Raman amplifiers. However, a tilt correction can also be performed by inserting a device such as a gain equalizer and not just optical amplifiers and Raman amplifiers. FIG. 21 is a diagram showing the structure of a gain equalizer. Here a wavelength demultiplexer 81 separates a WDM signal, which enters from an optical transmission line, into individual wavelengths, variable attenuators 82*a* to 82*d* perform gain control under the control of a controller 83 so as to flatten the spectrum of the light of each wavelength, and a wavelength multiplexer 84 multiplexes light of the wavelengths output from respective ones of the attenuators and sends the multiplexed signal to an optical transmission line. Accordingly, a gain equalizer can be inserted into an optical transmission line, the controller 83 can be instructed of the gain of each wavelength by an external control unit in such a manner that the tilt will become zero, and the controller 83 can control the gain of each attenuator to thereby make the tilt of the wavelength characteristic equal to zero.

In accordance with the wavelength-division multiplexing optical communication system according to the present invention as set forth above, if it will suffice to perform a slope correction by only an optical amplifier or Raman amplifier between nodes, an optical amplifier can be made to apply perform tilt compensation in dependence upon whether or not a Raman amplifier exists in another link. Further, in a case where uplink and downlink span distances and fiber types differ, an optical amplifier can be made to apply tilt compensation depending upon state of use of a Raman amplifier at a node on the downstream side of the optical amplifier. As a result, over-compensation does not occur and the number of optical amplifiers that perform slope correction can be reduced. Moreover, the state of use of a Raman amplifier at a node on the downstream side can be discriminated using a monitoring control signal or external control device.

Further, in accordance with the wavelength-division multiplexing optical communication system according to the present invention, an optical amplifier can be made to apply tilt compensation depending upon the state of flattening-control implementation by a Raman amplifier at a node downstream of the optical amplifier also in a case where the Raman amplifier performs flattening control. As a result, over-compensation does not occur and the number of optical amplifiers that perform slope correction can be reduced. Further, the state of flattening-control implementation by a Raman amplifier at a node on the downstream side can be discriminated using a monitoring control signal or external control device.

Further, in accordance with the wavelength-division multiplexing optical communication system according to the present invention, a slope correction can be performed solely by a Raman amplifier and it is unnecessary to perform a slope correction by an optical amplifier. This makes it possible to prevent a decline in optical SNR.

Further, in accordance with the wavelength-division multiplexing optical communication system according to the present invention, even if the amount of slope correction by an optical amplifier is limited, the shortfall is made up for by a Raman amplifier, thereby enabling slope compensation to be applied.

Further, in accordance with the wavelength-division multiplexing optical communication system according to the present invention, even if the amount of slope correction by an optical amplifier and Raman amplifier is limited, an optimum amount of correction can be set in the optical amplifier and Raman amplifier within the bounds of the limited amount of correction.

As many apparently widely different embodiments of the present invention can be made without departing from the spirit and scope thereof, it is to be understood that the invention is not limited to the specific embodiments thereof except as defined in the appended claims.

What is claimed is:

1. A wavelength-division multiplexing optical communication system in which an optical lossy medium, optical amplifiers and Raman amplifiers for compensating for loss in the optical lossy medium are cascade-connected, said system comprising:
    at least two transmission links to separately carry information between two points;
    a plurality of nodes provided within the transmission links, each node having at least two optical amplifiers provided respectively for the at least two transmission links;
    means, which is provided in an optical amplifier, for correcting slope of a wavelength characteristic produced by wavelength-dependent loss of the optical lossy medium;
    acquisition means for determining whether a Raman amplifier exists in a link which is connected to a node the same as that of the optical amplifier and is opposing a link in which said optical amplifier exists, or whether a Raman amplifier exists at an adjacent node downstream of said optical amplifier; and
    means for deciding, based upon the existence of the Raman amplifier, whether or not to cause the optical amplifier to perform a slope correction.

2. The system according to claim 1, wherein said acquisition means includes:
    means for demultiplexing light of a monitoring control signal from main-signal light; and
    means for acquiring, from the light of the monitoring control signal in a link opposing that of said optical amplifier, the state of use of a Raman amplifier at a node downstream of said optical amplifier.

3. The system according to claim 1, further comprising an external control unit for ascertaining the state of use of a Raman amplifier at each node based upon a monitoring control signal sent and received at each node together with main-signal light; wherein said acquisition means acquires, from said external control unit, state of use of a Raman amplifier at a node downstream of said optical amplifier.

4. A wavelength-division multiplexing optical communication system in which an optical lossy medium, optical amplifiers and Raman amplifiers for compensating for loss in the optical lossy medium are cascade-connected, said system comprising:
means, which is provided in an optical amplifier, for correcting slope of a wavelength characteristic produced by wavelength-dependent loss of the optical lossy medium;
acquisition means for acquiring state of flattening-control implementation which indicates whether a Raman amplifier is implementing control to flatten a wavelength characteristic at a node downstream of the optical amplifier, based upon the wavelength characteristic on an input side or output side of an optical amplifier connected downstream from said Raman amplifier; and
means for deciding whether or not to cause said optical amplifier to perform a slope correction based upon the state of flattening-control implementation by said Raman amplifier.

5. The system according to claim 4, further comprising:
a spectrum analyzer for detecting the wavelength characteristic on an input side or output side of said optical amplifier connected to said Raman amplifier; and
means provided in the Raman amplifier for performing flattening control based upon the wavelength characteristic detected by said spectrum analyzer.

6. The system according to claim 4, wherein said acquisition means includes:
means for demultiplexing light of a monitoring control signal from main-signal light; and
means for acquiring, from the light of the monitoring control signal in a link opposing that of said optical amplifier, the state of flattening-control implementation at a node downstream of said optical amplifier.

7. The system according to claim 4, further comprising an external control unit for ascertaining the state of flattening-control implementation by a Raman amplifier at each node based upon a monitoring control signal sent and received at each node together with main-signal light; wherein said acquisition means acquires, from said external control unit, the state of flattening-control implementation by a Raman amplifier.

8. A wavelength-division multiplexing optical communication system in which an optical lossy medium, optical amplifiers and Raman amplifiers for compensating for loss in the optical lossy medium are cascade-connected, said system comprising:
slope-correction control means, which is provided in a Raman amplifier, for correcting slope of a wavelength characteristic produced by wavelength-dependent loss of the optical lossy medium;
first means for calculating amount of slope correction based upon amount of tilt of a wavelength characteristic produced in a transmission line between said Raman amplifier and a node at a receiving end; and
second means for setting the amount of slope correction in said slope-correction control means of said Raman amplifier; wherein the amount of slope correction is calculated by acquiring an amount of tilt at an input section of each optical amplifier that is downstream from the Raman amplifier, summing the amounts of tilt to produce an overall tilt, dividing the overall amount of tilt by the number of input sections downstream from the Raman amplifier to produce a result, and adding the result of division to a current amount of slope correction.

9. The system according to claim 8, wherein there is provided a spectrum analyzer for detecting a wavelength characteristic at an input section of each optical amplifier; and
said slope-correction control means calculates amount of tilt of a wavelength characteristic at an input section of each optical amplifier based upon result of detection by said spectrum analyzer, and calculates a necessary amount of slope correction from this amount of tilt.

10. The system according to claim 8, further comprising:
a spectrum analyzer for detecting a wavelength characteristic at an input section of an optical amplifier; and
a flattening controller provided in a Raman amplifier for flattening a wavelength characteristic detected by said spectrum analyzer; wherein a slope correction is performed by adding amount of correction by flattening control to amount of correction by slope-correction control.

11. A wavelength-division multiplexing optical communication system according to claim 8, wherein
said first means calculates the amount of tilt by subtracting, from said overall amount of tilt of a wavelength characteristic produced between said Raman amplifier and a node at a receiving end, an amount of slope correction by the optical amplifiers that exist between said Raman amplifier and said node at the receiving end.

12. A wavelength-division multiplexing optical communication system in which an optical lossy medium, an optical amplifier and a Raman amplifier for compensating for loss in the optical lossy medium ore cascade-connected, said system comprising:
slope-correction control means, which is provided in each of an optical amplifier and Raman amplifier wherein amount of slope correction is limited, for correcting slope of a wavelength characteristic produced by wavelength-dependent loss of the optical lossy medium; and
means for acquiring information concerning wavelength-dependent loss of the optical loss medium between nodes and amount of slope correction by each optical amplifier and Raman amplifier, calculating from this information and amounts of slope correction an amount of tilt of a wavelength characteristic at an input section of each optical amplifier, deciding amounts of slope correction by the optical amplifiers in order from an upstream side using the amount of tilt, and repeating the above control with respect to a downstream node when the amount of slope correction has exceeded the capability of an optical amplifier, thereby deciding and setting amount of slope correction by each optical amplified wherein said optical performs a slope correction using the set amount of slope correction.

13. The system according to claim 12, further comprising:
a spectrum analyzer for detecting a wavelength characteristic at an input section of the optical amplifier; and
a flattening controller provided in a Raman amplifier for flattening the wavelength characteristic detected by said spectrum analyzer; wherein the slope correction is performed by adding the amount of the slop correction control and the amount of the flattening control.

14. The system according to claim 12, wherein there is provided a spectrum analyzer for detecting a wavelength characteristic at an input section of each optical amplifier;
amount of tilt of a wavelength characteristic at an input section of each optical amplifier is calculated based upon result at detection by sold spectrum analyzer.

15. The system according to claim 12, wherein correction of calculated amount of tilt is performed not only by optical amplifiers and Raman amplifiers but also by gain equalizers inserted Into said system.

16. A wavelength-division multiplexing optical communication system comprising:
- optical amplifiers provided at nodes, each node having two links respectively for optical transmission in two opposite directions;
- a lossy optical medium extending between the nodes;
- Raman amplifiers provided at selected links of selected nodes;
- a communication connection between two different links to identify to a receiver link whether a Raman amplifier is provided at a transmitter link;
- a slope correction unit provided at the receiver link, to correct the slope of a wavelength characteristic produced by wavelength-dependent loss in the optical lossy medium; and
- a decision unit to activate the slope correction unit only if a Raman amplifier is not provided at the transmitter link.

* * * * *

UNITED STATES PATENT AND TRADEMARK OFFICE
CERTIFICATE OF CORRECTION

PATENT NO.       : 7,245,421 B2
APPLICATION NO. : 10/695398
DATED            : July 17, 2007
INVENTOR(S)      : Takeshi Sakamoto It is certified that error appears in the above-identified patent and that said Letters Patent is hereby corrected as shown below:

Column 22, Line 34, change "ore" to --are--.

Column 22, Line 54, change "amplified" to --amplifier;--.

Column 22, Line 69, change "at" to --of--.

Column 22, Line 69, change "sold" to --said--.

Column 23, Line 4, change "Into" to --into--.

Signed and Sealed this

Thirteenth Day of November, 2007

JON W. DUDAS
*Director of the United States Patent and Trademark Office*